Dec. 26, 1944.    G. P. BENES    2,365,857
FORGING APPARATUS
Filed June 24, 1943    11 Sheets-Sheet 1

Inventor:
Gaspar P. Benes
By Wallace and Cannon
Attorneys

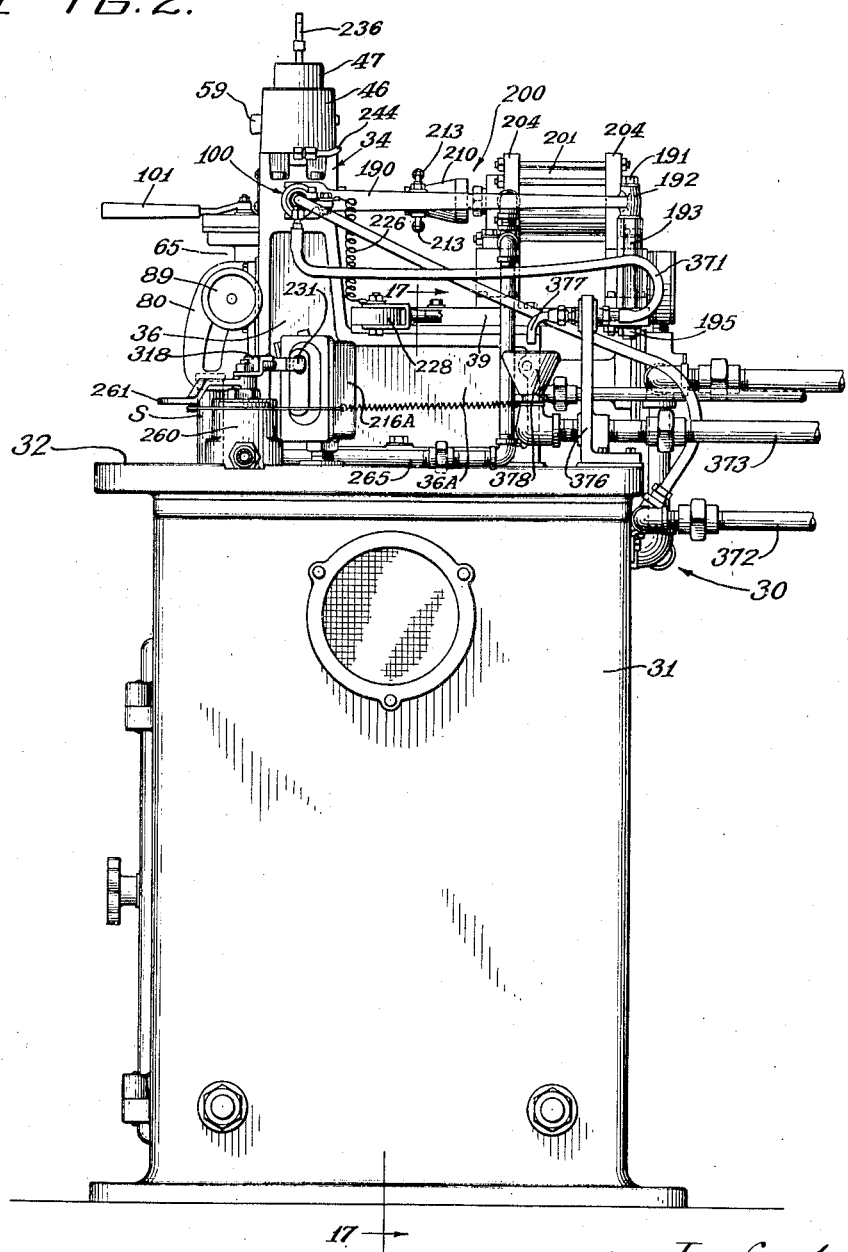

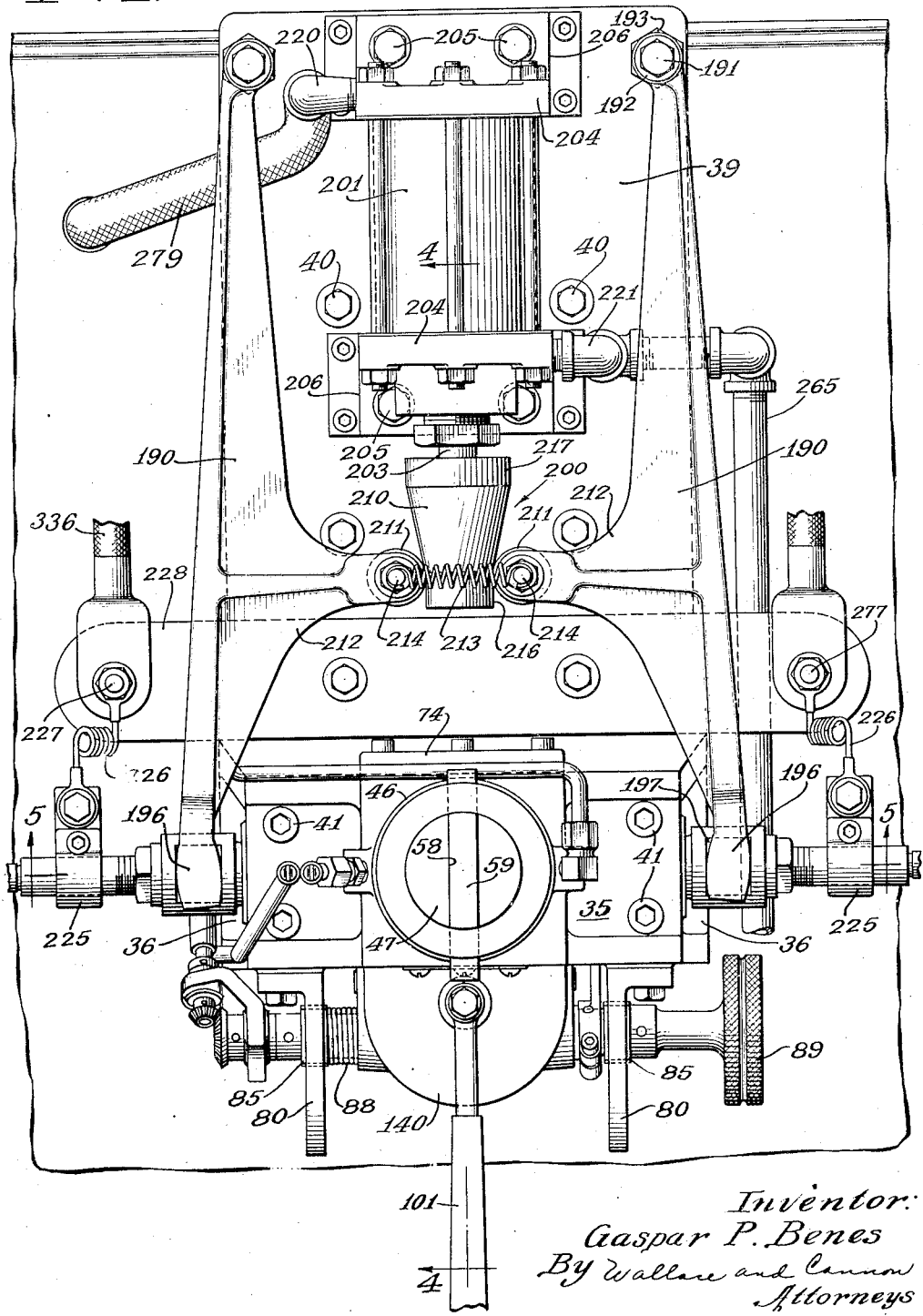

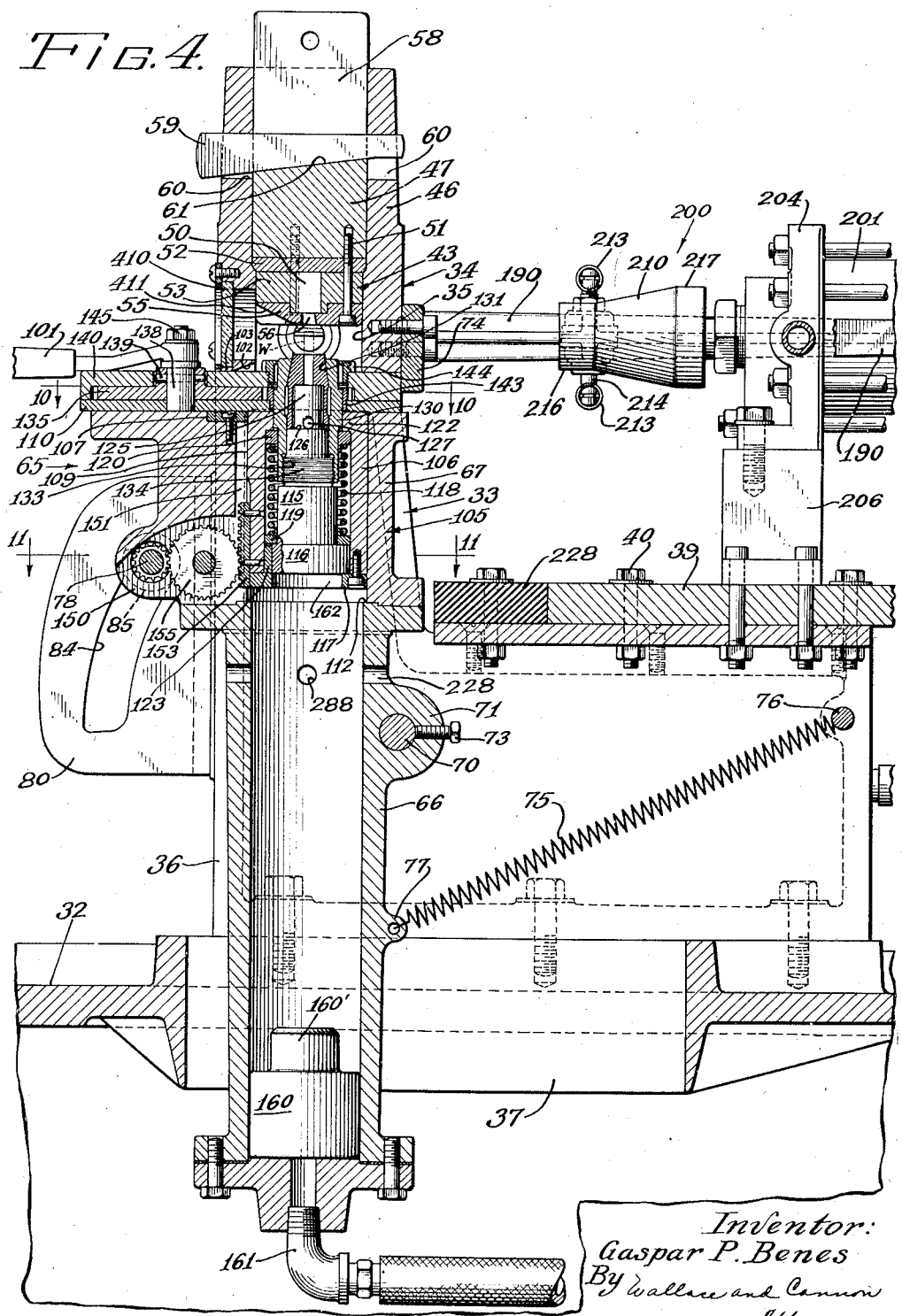

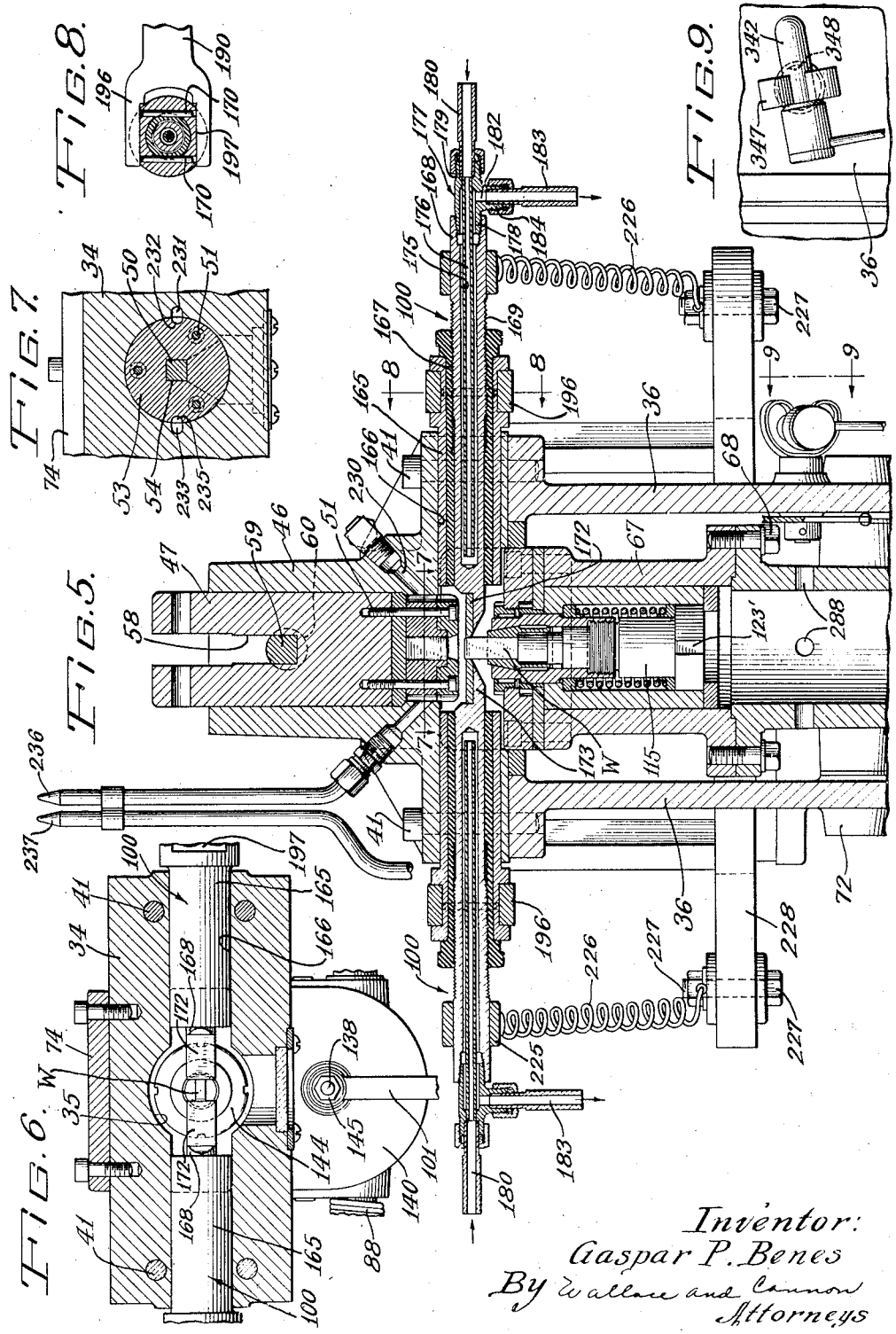

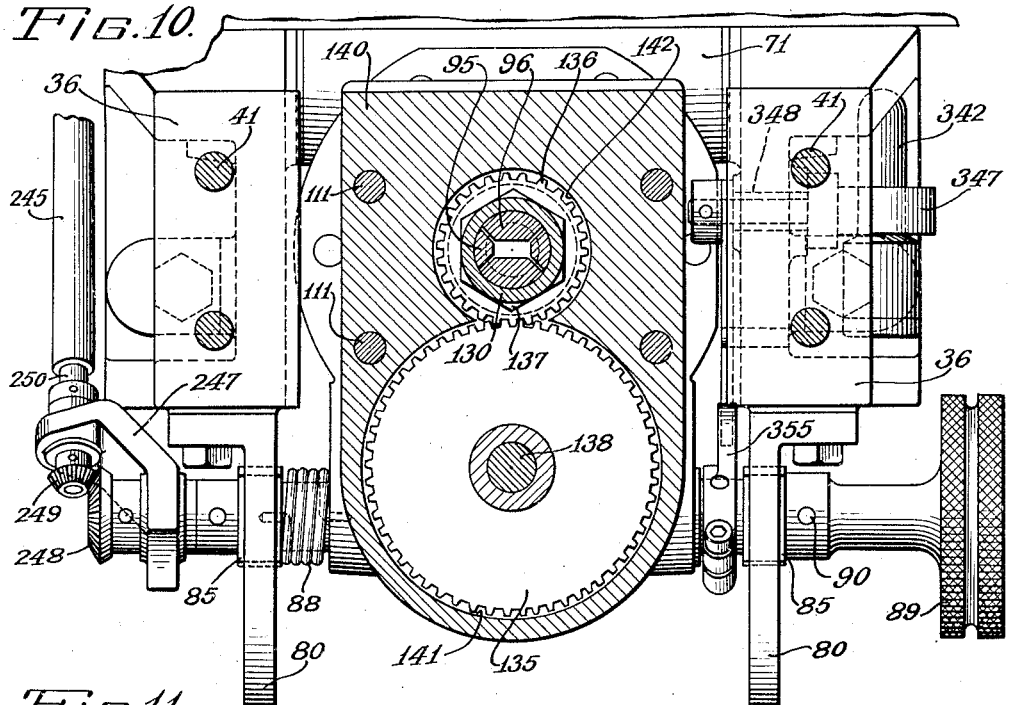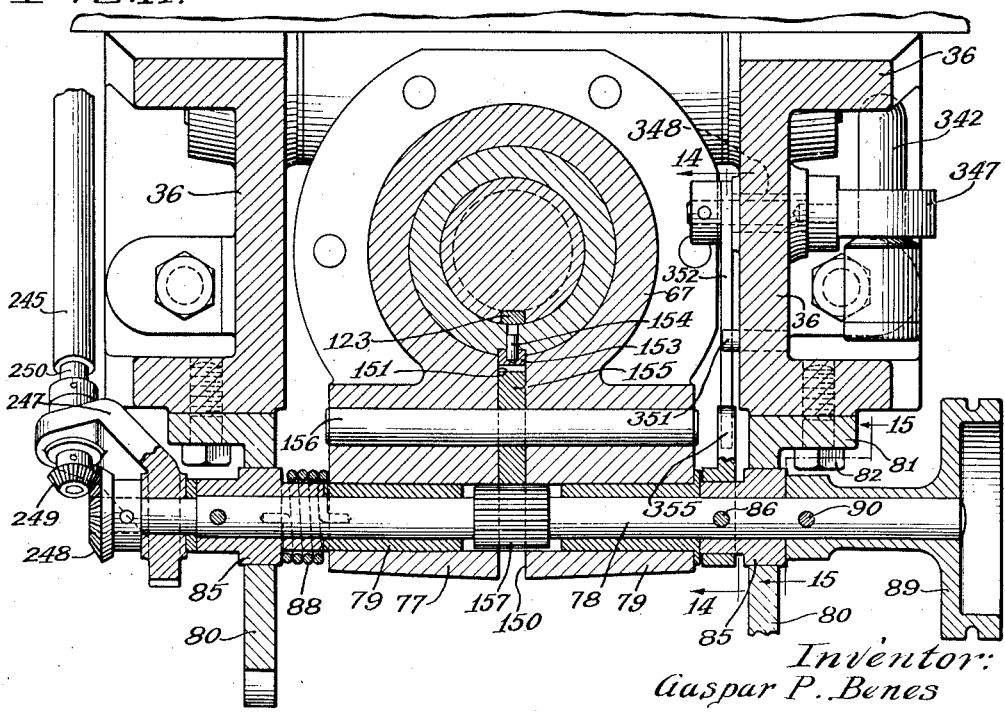

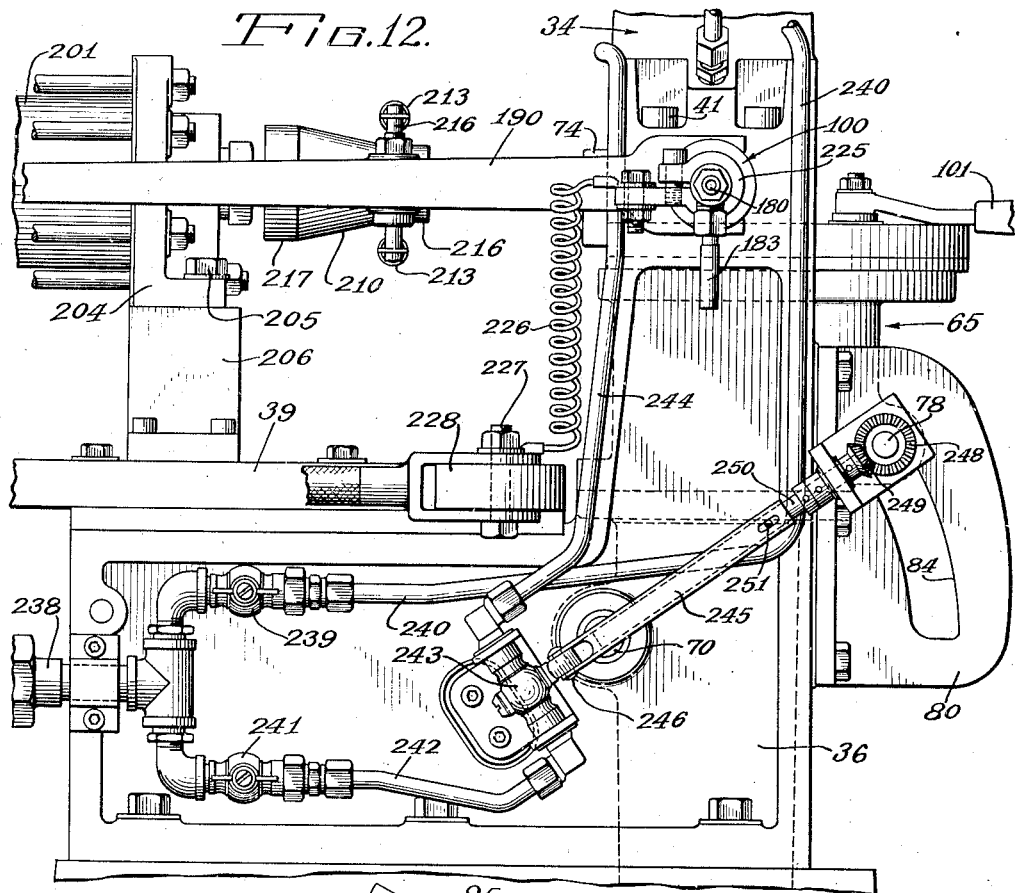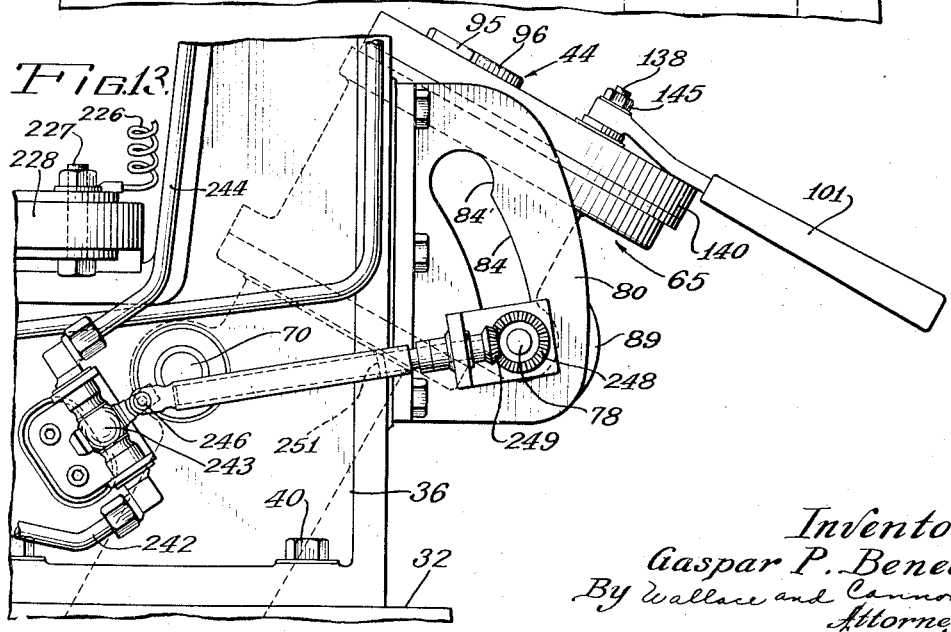

Dec. 26, 1944.　　　　　G. P. BENES　　　　　2,365,857
FORGING APPARATUS
Filed June 24, 1943　　　11 Sheets-Sheet 8
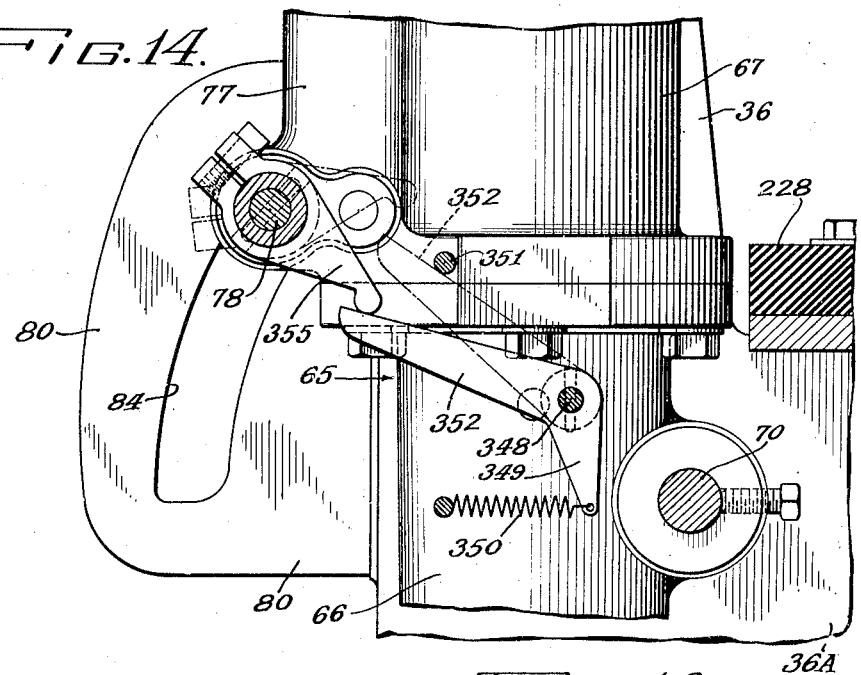
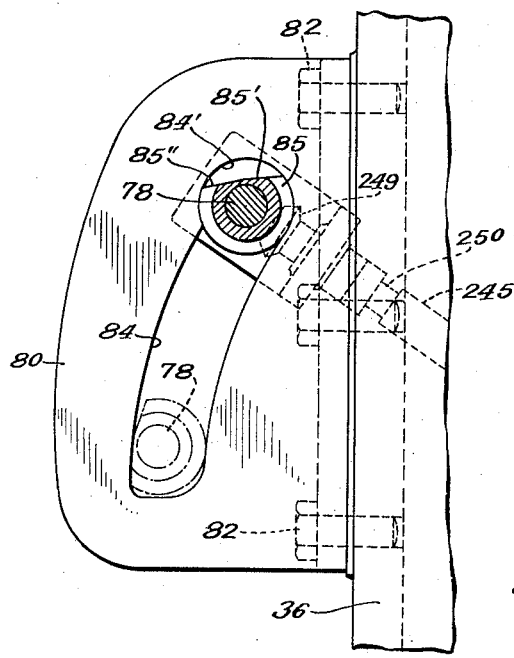
Inventor:
Gaspar P. Benes
By Wallace and Cannon
Attorneys

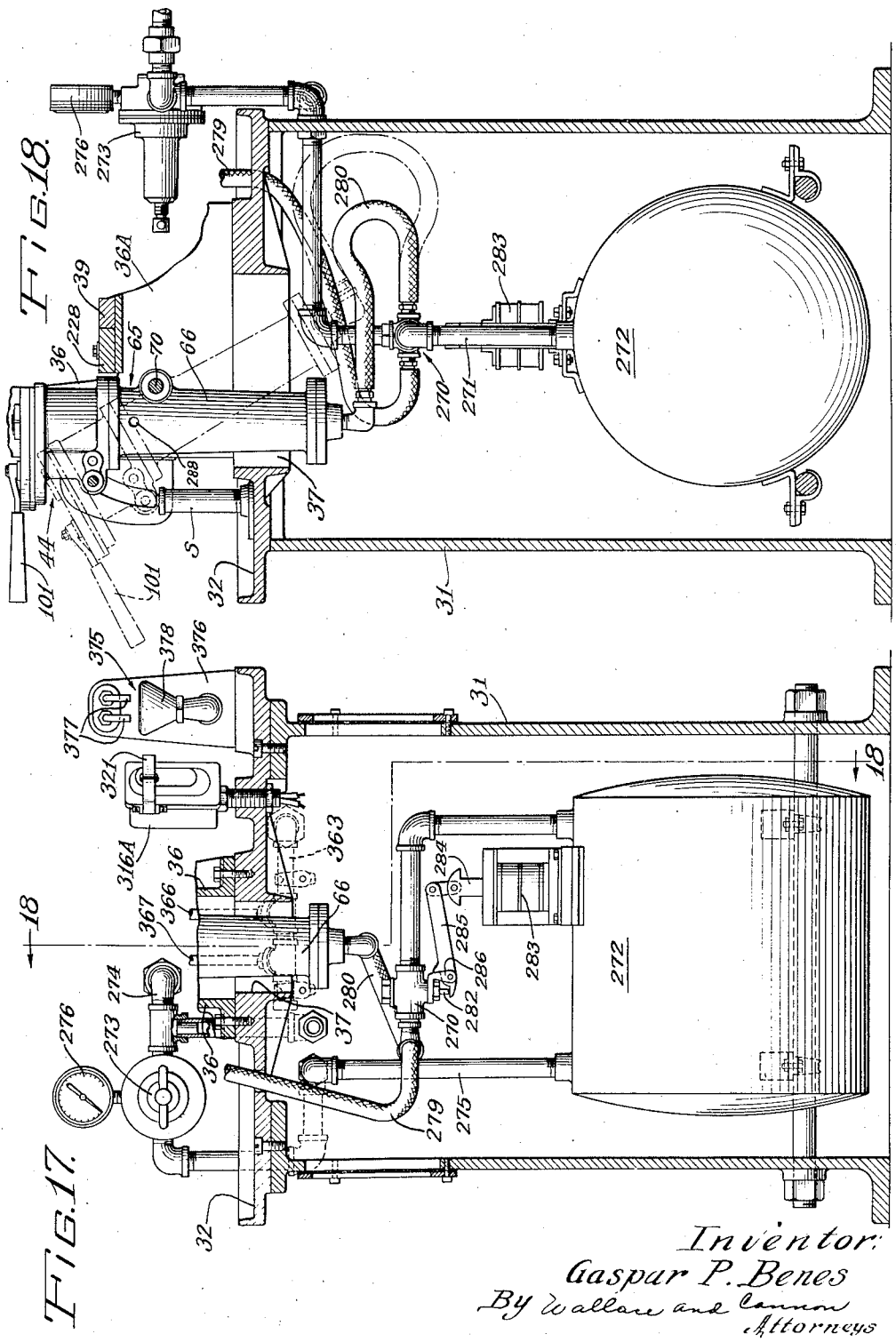

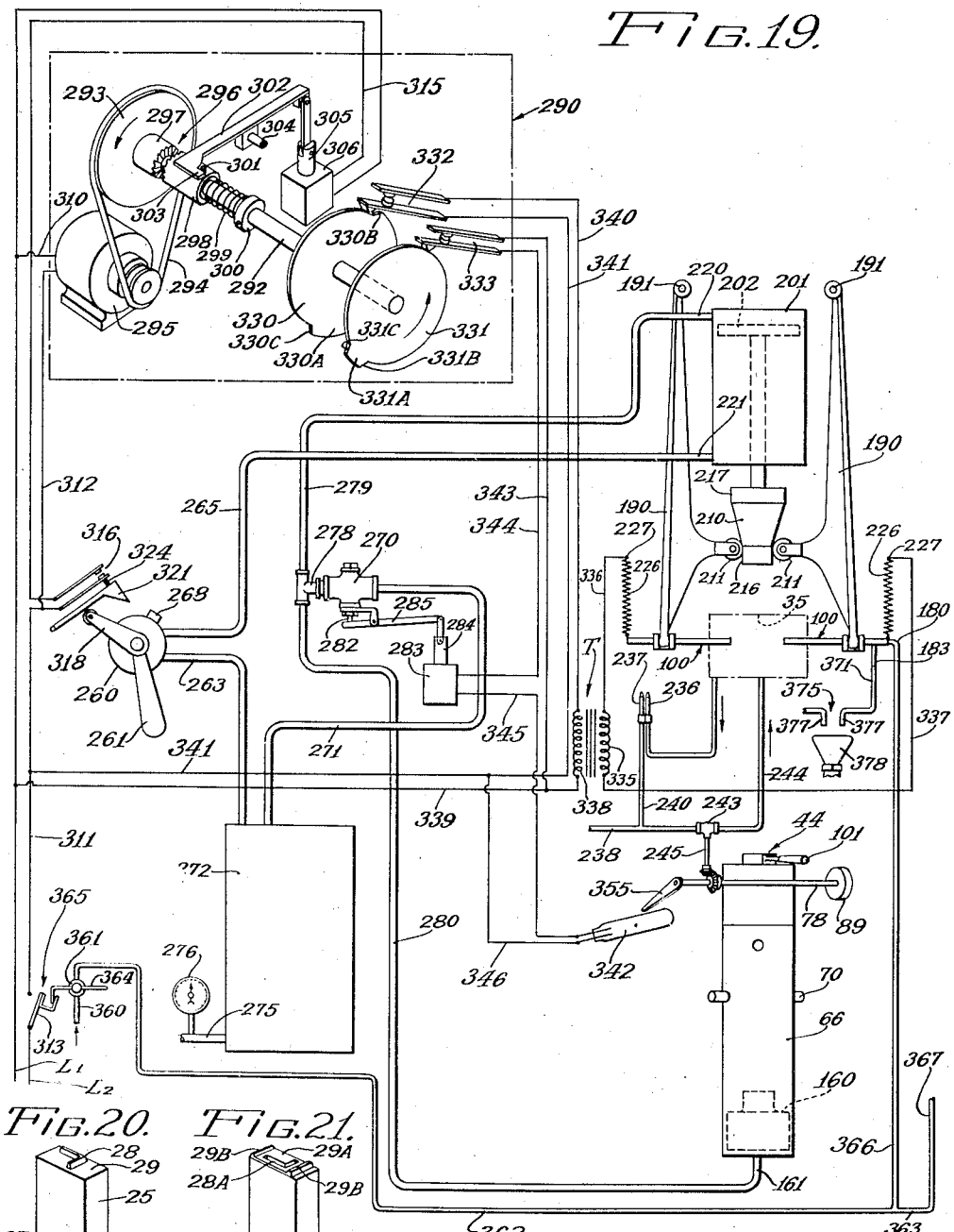
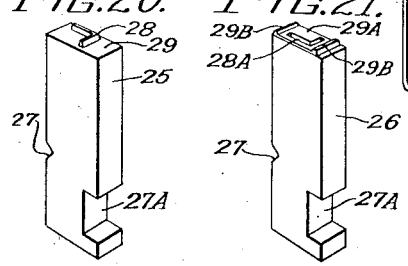

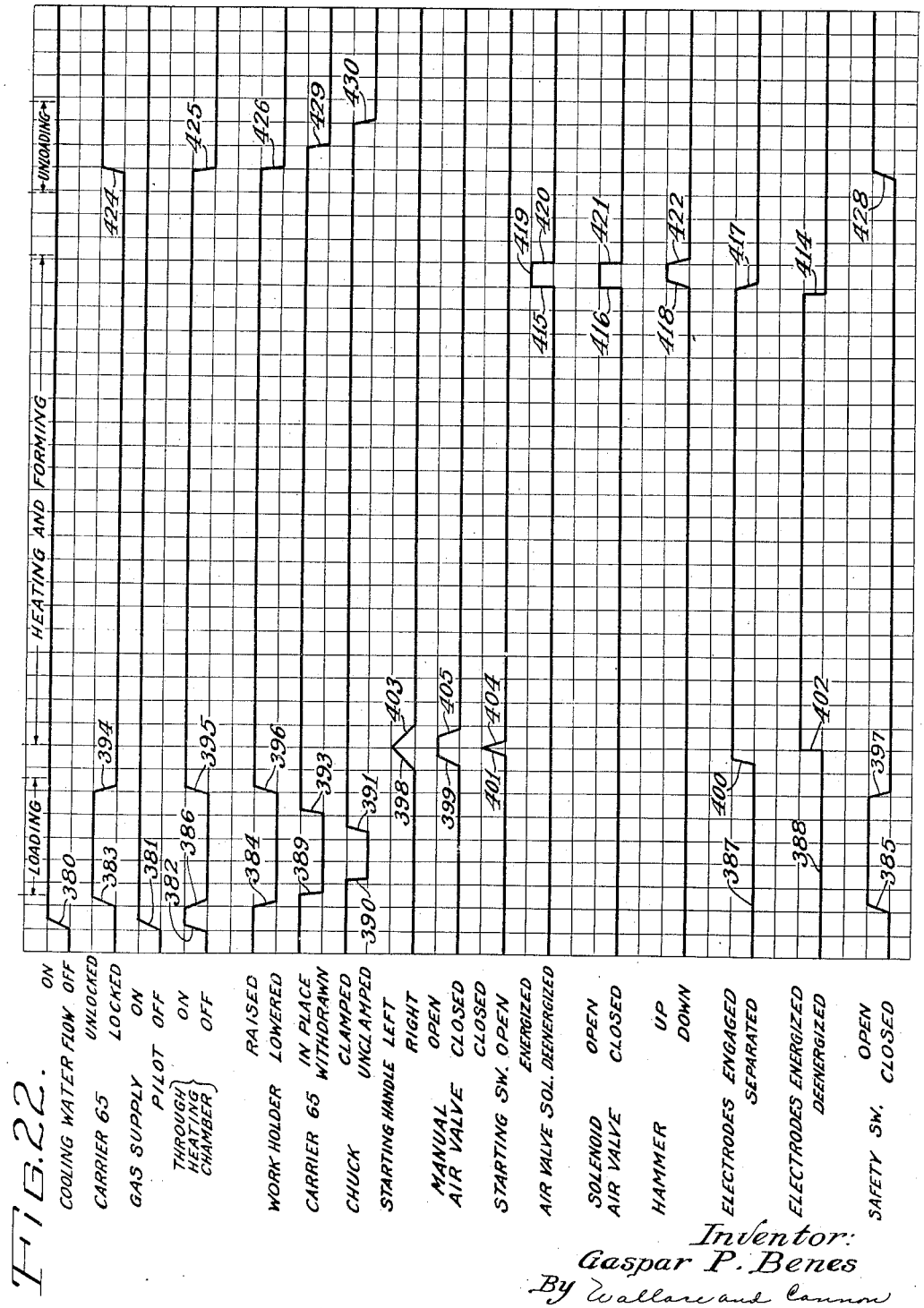

Patented Dec. 26, 1944

2,365,857

UNITED STATES PATENT OFFICE 2,365,857

FORGING APPARATUS

Gaspar P. Benes, Euclid, Ohio, assignor to Addressograph-Multigraph Corporation, Wilmington, Del., a corporation of Delaware Application June 24, 1943, Serial No. 492,003

22 Claims. (Cl. 219—3)

This invention relates to forging apparatus and particularly to such apparatus for forming punches, dies and the like by forging.

Many printing machines now in use employ printing devices upon which the type characters of the text which is to be printed are formed as embossures. Such printing devices may be of many different forms such as that disclosed in the Mohler Patent No. 1,812,894, patented July 7, 1931, or in the Gollwitzer Patent No. 2,132,412, patented October 11, 1938. Printing devices of the general character disclosed in the aforesaid patents include a rectangular carrier or frame with an embossable metal printing plate removably retained in position thereon, and in such printing devices, the type characters are embossed on the printing plate so as to appear in the relief on the operative face thereof. Printing devices may also be of a one-piece construction in the general form disclosed for example in the Duncan Patent No. 1,026,246, patented May 14, 1912, and in such instances the type characters are embossed in the metal of the one-piece printing device.

The type characters desired upon such printing devices or printing plates may be embossed thereon by means of an embossing machine such as that illustrated in the Duncan Patent No. 1,518,904, patented December 9, 1924, and in such an embossing machine the actual embossing operation is effected by pairs of punches and dies which are selected and operated through an embossing operation in respect to each character which is to be formed on the printing device or printing plate. The neatness and accuracy of form and relation of the characters of the printed impression made from such printing device are dependent in a large measure upon the accuracy of form and relationship of the punches and dies of the embossing machine, and to enable these punches and dies to be produced with the maximum of accuracy of form is an important object of this invention.

The punches and dies in such an embossing machine are of course subjected to severe service in the course of which the working surfaces of the punches and dies often become badly worn or deformed, thus making replacement thereof necessary. In the past, however, such replacement of worn punches and dies has been relatively expensive primarily because of the cost of production of the punches and dies, and to enable these to be economically produced is another important object of this invention. Other objects related to the foregoing are to simplify the preparation of punches, dies and the like, and to accomplish this in such a way that the punches and dies may be produced with the required accuracy of form and at a relatively high rate.

In the patent to Thompson No. 1,868,777, patented July 26, 1932, an apparatus is disclosed wherein punches, dies and the like are produced by forging, and it is a further object of this invention to improve and simplify the mechanism for accomplishing such forging operations. Other and further objects related to the foregoing are to simplify the loading and unloading of work blanks in a machine which forges punches, dies and the like; to enable the operator of such a machine to constantly and easily check and verify the operational characteristics of such a machine so as to prevent damage to the work or to operative parts of the machines; and to improve and standardize the quality and accuracy of the work produced by such machines.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 2 is a side elevational view of the machine shown in Fig. 1;

Fig. 3 is a fragmental plan view of a portion of the apparatus shown in Figs. 1 and 2;

Fig. 4 is a fragmental vertical sectional view taken substantially along the line 4—4 of Fig. 3;

Fig. 5 is a fragmental vertical sectional view taken substantially along the line 5—5 of Fig. 3;

Fig. 6 is a fragmental horizontal sectional view illustrating the heating chamber and the relationship of the electrodes to a workpiece;

Fig. 7 is a fragmental horizontal sectional view taken substantially along the line 7—7 of Fig. 5;

Fig. 8 is a vertical sectional view taken along the line 8—8 of Fig. 5;

Fig. 9 is a fragmental elevational view as viewed from the line 9—9 in Fig. 5;

Fig. 10 is a plan section taken substantially along the line 10—10 in Fig. 4;

Fig. 11 is a plan section taken substantially along the line 11—11 in Fig. 4;

Fig. 12 is a fragmental elevational view showing the left hand side of the machine;

Fig. 13 is a view similar to Fig. 12 and showing the parts in different positions;

Fig. 14 is a fragmental vertical sectional view taken substantially along the line 14—14 in Fig. 11;

Fig. 15 is a vertical sectional view taken substantially along the line 15—15 in Fig. 11;

Fig. 16 is a fragmental plan view showing a portion of the control mechanism of the machine;

Fig. 17 is a fragmental vertical sectional view taken substantially along the line 17—17 in Fig. 2;

Fig. 18 is a fragmental vertical sectional view taken substantially along the line 18—18 of Fig. 17;

Fig. 19 is a schematic view illustrating the electrical and pneumatic control mechanism of the machine;

Fig. 20 is a perspective view of a punch of the character which is to be formed by the machine of this invention;

Fig. 21 is a perspective view of a die which is adapted for cooperation of the punch shown in Fig. 20 and which is adapted to be formed by the machine of this invention; and Fig. 22 is a timing chart illustrating the operating sequence and timing of the various elements of the machine.

Figure 1:
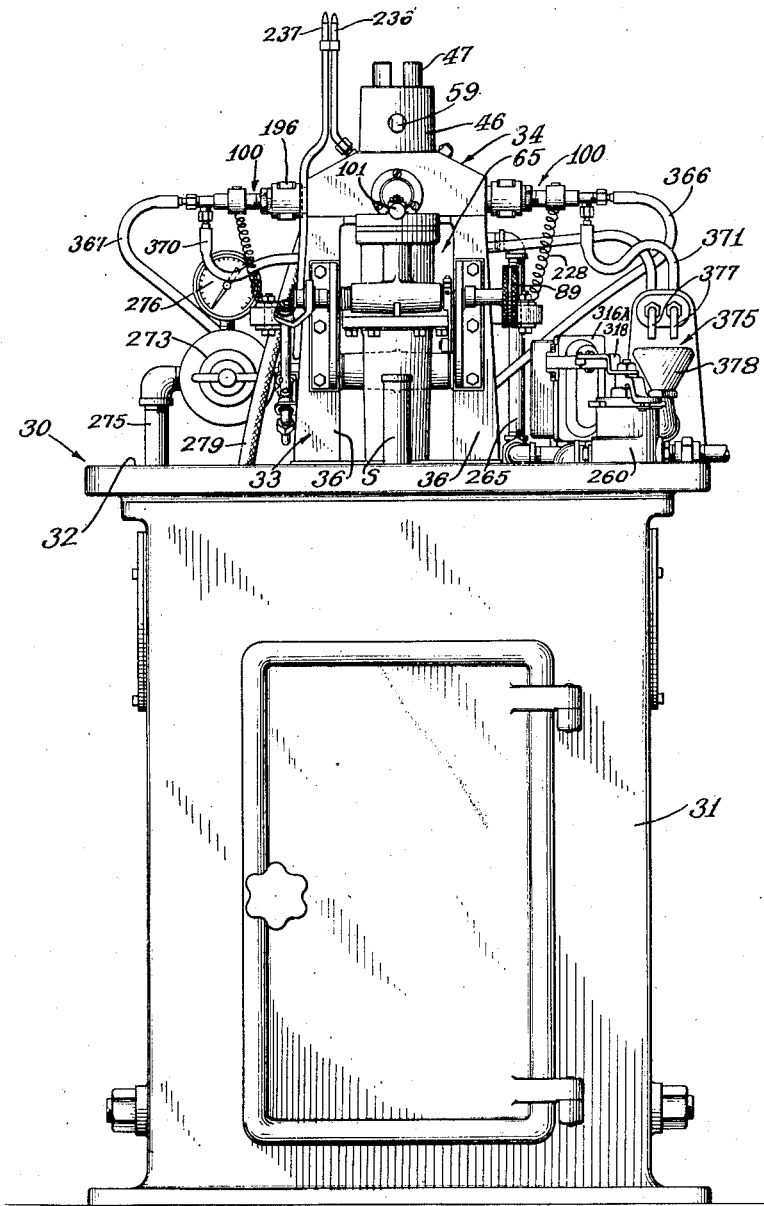
Fig. 1 is a front elevational view illustrating a forging apparatus embodying the features of the invention.

The machine of the present invention is particularly adapted for use in forging punches such as that identified as 25 in Fig. 20 of the drawings, or for the formation of dies such as that indicated at 26 in Fig. 21. In the formation of a punch as 25, a rectangular work blank substantially of the same shape as the punch 25 is employed. The notch 27 and the slot 27A, however, are not present in the blank at the time of the forming or forging operation. The blank from which the punch 25 is to be made is first heated at one end thereof, and the heated end thereof is then forced with a forging blow into a master die which forms the desired punch element 28 thereon and a border or base surface 29 about the base of the punch element 28. The punch element 28 as herein shown is arranged in the form of a capital letter L, and the die of Fig. 21 is shown as being adapted to cooperate with the punch 25 in forming such a letter L on a printing plate or the like. The die 26 is similarly formed from a blank which is generally rectangular in shape, but here again the formation of the die surfaces is accomplished prior to the formation of the locating notch 27 and locating slot 27A. Such a work blank is heated at one end thereof and this heated end is then forced with a forging stroke into a master forming die which forms a die recess 28A in the heated end of the work blank. A border surface 29A is formed about the die recess 28A in the aforesaid forging stroke, and for certain uses, a pair of ridges 29B may be formed in the same operation at opposite ends of the base surface 29A. The punch 25 and die 26 constitute a cooperating pair of elements adapted for use in an embossing machine such as that shown in the aforesaid Duncan Patent No. 1,518,904, but it will be recognized that other forms of punches, dies or the like may also be formed through the use of the apparatus of the present invention.

In the form chosen for disclosure herein the invention is embodied in a forging machine 30 having a relatively large upstanding base 31 which affords a table top 32, and an upstanding frame structure 33 is mounted on the table top 32 to serve as a support for a housing 34 which forms a heating and forging chamber 35, and the other related heating and forging elements are supported on the frame structure 33 in association with the housing 34. As shown in Figs. 1, 2, 4 and 12, the frame structure 33 is afforded by a pair of L-shaped castings which serve as standards 36, and these standards 36 are disposed on the table top 32 on opposite sides of a clearance slot 37 formed in the table top, and the arrangement is such that one of the arms of each L-shaped member extends upwardly near the forward edge of the table top 32 while the other arm 36A of each L-shaped member extends in a rearward direction. As will be evident in Fig. 12 of the drawings, the L-shaped standards 36 are formed with central webs and with marginal flanges about these webs, and fastening bolts 38 are passed through the lower flanges of the standards 36 to secure the standards in position on the table top 32. Additional rigidity is afforded in the frame structure 33 through the provision of a mounting plate 39 which is rested upon the upper flanges of the rearwardly extending portions of the standards 36 and is secured to the flanges of these portions of the standards by means such as bolts 40. The mounting plate 39 also serves as a support for various elements of the mechanism as will hereinafter become evident.

As shown in Fig. 1 of the darwings, the standards 36 are spaced apart in a lateral direction and the housing 34 extends across the upper ends of the standards 36 so as to span the space therebetween, and the housing 34 is held in place on the upper ends of the standards by means such as cap screws 41. It is within the heating and forging chamber 35 that the work blank, as W, is heated and then forged to the desired form, and for use in accomplishing the forging operation a master die holder 43 and a work holder 44 are adapted to be supported in opposed relation within the chamber 35 as shown in Fig. 4 of the drawings, the die holder 43 being supported at the top of the chamber 35 in the present instance so as to face downwardly, while the work holder 44 is supported at the bottom of the chamber 35 so as to face upwardly in alignment with the die holder 43. In order to afford such a relationship, the master die holder 43 is arranged to be supported within an upstanding mounting sleeve 46 which is formed integrally with the walls of the housing 34 and into which a cylindrical supporting block 47 may be extended. The supporting block 47 is arranged so that the die holder 43 may be secured to the lower end of the block, and thus when the block 47 is inserted downwardly into the mounting sleeve 46, the die holder 43 will be disposed in the upper portion of the heating chamber 35.

In the form herein shown the die holder 43 comprises three separably related plates within and between which a master die 50 may be located and positioned by the cooperative action of these three plates, the plates are secured in position on the lower end of the mounting block 47 by means such as cap screws 51. Thus, as shown in Figs. 4, 5, and 7, the master die holder 43 includes an upper plate 52 which is disposed against the lower face of the mounting block 47 and which serves as a striking or abutment plate, an intermediate plate 53 which has a neatly fitted opening 54 therethrough to receive the master die 50, and a lower retaining plate 55 which engages the marginal edges of the lower end of the master die 50 and has an entry opening 56 therein through which a heated work blank W may be forced into operative engagement with the working surfaces of the master die 50. If desired, the upper face of the plate 55 may be counterbored and the lower face of the plate 53 may have an extended neck about the opening 54 to afford a lateral interlock between the plates 53 and 56 to thereby accurately locate the entry opening 56 with respect to the working surfaces of the master die 50. It will be observed that the plate 53 is of a somewhat smaller diameter than the plate 52, and an upwardly facing shoulder is afforded within the sleeve 56 to cooperate with the plate 52 in limiting the downward movement of the mounting block 57. This arrangement assures the proper location of the master die 50 in a vertical direction. The mounting block 47 has a transverse slot 58 therein and the mounting block 47 is held releasably in its lowermost position within the sleeve 46 by a transverse drive pin 59 which extends through slots 60 in the opposite walls of the sleeve 46 and through the slot 58 in the mounting block 47. The lower edge of the drive pin 59 has a sloping cam surface thereon which is adapted to engage the sloping bottom surface 61 of the slot 58 so that by driving the pin 59 to the right in Fig. 4, the mounting block 47 may be driven downwardly until the plate 52 is seated firmly upon the upwardly facing shoulder within the sleeve 46.

As shown in Fig. 4 of the drawings the work holder 44 is disposed in its operative position within the heating and forging chamber 35, and to enable convenient loading and unloading of work blanks W in the work holder, means are provided which support the work holder for movement from its operative position of Fig. 4 to a forward loading position shown in Fig. 13 of the drawings, and under the present invention this is accomplished in such a way that during this movement back and forth between the loading position and the operative position, the work holder 44 is maintained in substantially its normal relation to most of the other operative elements of the mechanism. In accomplishing this purpose, a carrier 65 is provided upon which the work holder 44 is mounted and the carrier 65 is arranged for shifting movement to carry the work holder 44 back and forth between its loading position and its operative position. As will hereinafter be described in detail, the work holder 44 is not only shiftable with the carrier 65 to the aforesaid loading position, but is also mounted on the carrier for longitudinal movement through a forging stroke in an upward direction toward the master die 50, and under the present invention the actuating means for driving the work holder 44 through such a forging stroke are also mounted on the carrier 65 so as to be in their operative relation to the work holder 44 at all times. Such actuating means as herein shown are pneumatic in character and for this reason an elongated cylinder 66 is provided which is preferably utilized as a part of the carrier 65. Thus the carrier 65 as herein shown comprises the elongated cylinder 66 and a mounting sleeve 67 which is secured as by bolts 68 to the flanged upper end of the cylinder 66.

The carrier 65 is disposed between the two standards 36 with the lower portion of the cylinder 66 extending downwardly through the slot 37 in the table top 32, and the carrier is supported by these standards so that the desired shifting movement of the carrier 65 may be attained. Such shifting movement in the present instance is pivotal in character, and for this reason a pivotal mounting shaft 70 is extended between the two standards 36 and through a bearing lug 71 which is formed on the rear side of the cylinder 66 adjacent to the upper end thereof as shown in Figs. 4, 5, 14, and 15. The shaft 70 is rotatable in bearings 72 which are provided on the two standards 36, and the carrier is fixed to the shaft 70 by a set screw 73. When the carrier is in the vertical or operative position shown in Fig. 4 of the drawings, an upper portion thereof, which will be described in detail hereinafter, is engaged with the forward face of a stop plate 74 which is bolted to the rear face of the housing 34 so as to extend downwardly therefrom and act as a stop to determine the extent of rearward movement which may be imparted to the upper end of the carrier. The carrier 65 is normally urged in a counterclockwise direction as viewed in Fig. 4 toward the loading position of Fig. 13, and this is accomplished by a spring 75, Fig. 4, which acts between an anchoring rod 76 and a lug 77 formed on the rear side of the cylinder 66 below the pivotal axis 70.

Thus, in order to place the carrier 65 in its operative position of Fig. 4, the upper end of the carrier must be forced rearwardly against the action of the spring 75 to the position of Fig. 4, and means are provided for securing or locking the carrier in this operative position. For this purpose the mounting sleeve 67 has a forwardly extending bearing portion 77 through which a locking shaft 78 is extended parallel to the pivotal shaft 70 and spaced upwardly and forwardly a considerable distance from the pivotal shaft 70. The locking shaft 78 is mounted in bearings 79 and is arranged to extend beyond the opposite sides of the bearing portion 77 to positions located in front of the two standards 36. For cooperation with the locking shaft 78, a pair of locking plates 80 are secured to the forward faces of the standards 36 as by means of flanges 81 and bolts 82, and these locking plates 80 have locking and guiding slots 84 formed therein and centered upon the pivotal shaft 70, the ends of the locking shaft 78 being arranged to extend through these locking and guide slots 84. A pair of locking cams 85 are secured on the shaft 78 as by pins 86, and these cams 85 are so positioned on the shaft 78 as to ride in the locking and guiding slots 84. The locking cams 85 are generally circular in form and are of such a diameter that they may be rotated only when located within enlarged circular portions 84' of the slots 84, these enlarged portions 84' being formed at the upper ends of the slots 84.

The locking cams 85 are flattened on one side to afford two flat surfaces 85' and 85'' which are disposed at a slight angle to each other as indicated at Fig. 15, and when the shaft 78 is rotated in a counterclockwise direction from the position shown in Fig. 15, the cams 85 are so positioned that the flat surfaces 85' and 85'' thereof are substantially aligned with the outer edge surfaces of the slots 84. When this relationship has been established, the carrier 65 may be rocked about its pivot shaft 70 toward the forward loading position of Fig. 13 so as to move the upper end thereof in a forward direction, and as this is done, the locking cams 85 move downwardly in the slots 84 to the relationship which is shown in dot-dash outline in Fig. 15. This loading position is determined by an upstanding stop S which is mounted on the table top 32 in such a position as to lie in the path of the bearing portion 77 of the carrier. The height of the stop S is such that the cams 85 are maintained out of contact with the lower ends of the slots 84 and thus the faces of the cams 85 are not injured by striking the ends of the slots. The shaft 78 is normally urged in a clockwise direction toward the locking position shown in Fig. 15 by a torsion spring 88 which surrounds the shaft 78 and acts between the shaft and the bearing portion 77. Thus when the carrier 65 is returned from its loading position against the action of the spring 75 and to the upright or operative position of Fig. 4, the spring 88 operates the shaft 78 to turn the shaft to its effective or locking position, which is best illustrated in Fig. 15, to thereby lock the cams 85 in the enlargements 84' of the slots 84. When an operator wishes to release the locking means, this may be accomplished by actuation of a knurled operating head 89 which is secured by a pin 90 to the right hand end of the locking shaft 78.

The holder 44 is in the nature of a chuck having a plurality of jaws 95 and 96, as shown in Fig. 10, these jaws being so formed and related that they may be clamped about the sides of the lower portion of a work blank W so as to support the work blank in an upwardly projecting relation wherein the upper side edges of the work blank W may be engaged by the inner ends of a pair of electrodes 100, Fig. 5. The chuck jaws 95 and 96 are adapted to be operated between their clamped and unclamped positions by means including an operating handle 101 which is mounted on and extends forwardly from the carrier 65, as will hereinafter be described in detail. When the work holder 44 is empty, the normal position thereof in a vertical sense is such that the carrier 65 may be rocked forwardly to the loading position of Fig. 13, and during such movement the upper edges of the work holder and the associated parts are moved past a sloping lower edge 102 of the forward side wall 103 of the chamber 35. When, however, a work blank W is supported in the work holder 44, the work blank projects upwardly for a considerable distance above the work holder 44 and as a result, the work blank W tends to strike the inner surfaces of the wall 103 in a forward withdrawing movement of the carrier 65. Because of this the work holder 44 is supported on the carrier by means of a shiftable locating structure 105 which provides an upper or advanced position in which it is shown in Fig. 4, and a lower or retracted position wherein the upper end of a work blank W will clear the edge of the wall 103 in a forward rocking movement of the carrier 65.

As herein shown the locating structure 105 includes a locating sleeve 106 mounted within the sleeve 67 for limited sliding movement during which the sleeve 106 is held against rotative movement by a stationary key 107 mounted in the bearing block 71 and fitting into longitudinal groove 109 formed in the forward side of the sleeve 106. The upward movement of the sleeve 106 is limited by an engagement of the sleeve with a plate 110 which is secured across the upper end of the sleeve 67 by means including bolts 111. Downward movement of the sleeve 106 is limited by engagement of a part mounted on the sleeve 106 with an annular shoulder 112 formed by the upper end of the cylinder 66 as shown in Fig. 4. The locating sleeve 106 has the work holder 44 mounted therein so that when the locating sleeve 106 is moved downwardly from the position shown in Fig. 4, the work holder 44 will be correspondingly withdrawn in a downward direction; and in addition, the work holder 44 is so associated with the sleeve 106 that when the sleeve 106 is in its upper position, the work holder may be further advanced with relation to the sleeve 106 through a forging stroke. For this purpose the work holder 44 is mounted upon the upper end of a transmitting plunger 115 which is disposed for limited sliding movement within and with respect to the sleeve 106. Thus the plunger 115 has an enlarged head 116 formed on its lower end so as to engage the inner surface of the sleeve 106, and a plate 117 secured across the lower end of the sleeve 106 limits downward movement of the plunger 115. A spring 118 surrounds the plunger 115 within the sleeve 106 and at its lower end this sleeve acts upon the head 116 through a bearing ring 119 to urge the plunger 115 downwardly, the upper end of the spring being arranged to bear against a pressure ring 120 which in turn bears against an inwardly directed annular flange 122 formed at the upper end of the sleeve 106. The plunger 115 is maintained in a predetermined rotative relation to the sleeve 106 by a key or spline 123 which is formed on the bottom plate 117 and extends upwardly within the sleeve 106 to engage a complemental longitudinal groove 123' formed in the flange 116 of the plunger.

At its upper end the plunger 115 has a reduced portion 125 at the lower end of which an upwardly facing shoulder 126 is afforded and the jaws 95 and 96 are disposed about the reduced portion 125 for clamping and unclamping movement and are held against relative rotative movement by a pin 127 which extends through the reduced portion 125 and engages at least certain of the jaws 95 or 96. The desired clamping force is applied to the several jaws 95 and 96 by an actuating sleeve 130 which has inwardly tapered surfaces 131 adjacent its upper end which engage complemental tapered inner surfaces on the upper portions of the chuck jaws 95 and 96. The arrangement is such that by imparting downward movement to the actuating sleeve 130, the jaws 95 and 96 may be actuated toward each other in a clamping direction.

This longitudinal movement of the actuating sleeve 130 is attained by a threaded lower portion 133 formed on the sleeve so as to engage complemental threads 134 formed on the plunger 115 somewhat below the shoulder 126. Thus by imparting rotative movement to the actuated sleeve 130, this sleeve may be moved downwardly to clamp the jaws 95 and 96 or upwardly so as to release these jaws. Such rotative movement is imparted to the sleeve 130 through means actuated by the operating handle 101, and as herein shown such means include a large gear 135, Fig. 10, mounted on the plate 110 and meshed with a smaller gear 136 which is drivingly connected to the sleeve 130 so that rotative movement may be transmitted to the sleeve from the gear 136. As herein shown the connection between the gear 136 and the sleeve 130 is afforded by a hexagonal opening 137 formed in the gear 136 so as to slidably embrace a complemental hexagonal portion of the outer surface of the sleeve 130. Thus the sleeve 130 may be rotated, and during and after such rotation is free for at least a limited amount of longitudinal sliding movement relative to the gear 136. In the present instance the gears 135 and 136 are supported by means which include the plate 110. Thus the gear 135 has a stub shaft 138 secured therein by a cross pin 139, and the stub shaft 138 is extended downwardly into a bearing opening formed in the plate 110. When the stub shaft 138 is in this position, it is held in place and protected by an upper plate 140 which is secured in position by the bolts 111. The plate 140 has circular recesses 141 and 142 formed therein to house the gears 135 and 136 respectively, and the gear 136 is centered by a bearing sleeve 143 which is formed on the gear and extends downwardly into a bearing opening formed in the plate 110. Preferably a dust cap 144 is threaded into the plate 140 about the upwardly projecting end portion of the sleeve 130. The handle 101 is connected to the upwardly projecting end 145 of the stub shaft 138 so that by lateral movement of the handle 101, the gear 135 may be rotated. This rotation is transmitted to the gear 136 and thence to the actuating sleeve 130 for clamping or unclamping the jaws 95 and 96.

When the work holder 44 is to be moved to its loading position of Fig. 13 for loading or unloading of a work piece, the locating structure 105 is withdrawn in a downward direction so as to afford the requisite amount of clearance beneath the lower edge of the wall 103, and in accordance with the present invention this withdrawing movement is accomplished at the same time as the unlocking of the locking cams 85. Thus, as shown in Figs. 4 and 11, the bearing portion 77 of the carrier 65 has a vertical slot 150 extended into its forward face at about the level of the locking shaft 78, and this slot 150 is extended into the inside of the sleeve 67 and vertically thereof to afford a narrow and relatively shallow clearance slot 151 in the forward side of the inner surface of the sleeve 67. Within this vertical clearance slot 151, a relatively short rack 153 is disposed and is secured to the outer forward surface of the sleeve 102 by means including a pair of pins 154. The rack 153 is meshed with a gear 155 which is mounted within the slot 150 upon a transverse supporting pin 156. The forward edge of the gear 155 is engaged with a pinion 157 which is fixed on the locking shaft 78 between the two bearing sleeves 79, and hence it will be clear that the locating structure 105 may be operated by rotating movement of the locking shaft 78. The arrangement in the present case is such that when the locking shaft 78 is operated in a counterclockwise direction in Fig. 4 through an unlocking movement, the gear 155 will be operated in a clockwise direction as viewed in Fig. 4 and this will cause the locating structure 105 to be withdrawn in a downward direction. Hence when the operator tilts the carrier 65 in a forward direction so as to move the locking cams 85 into the narrow portion of the slots 84, the locking shaft 78 will be held in the same rotative position and the locating structure 105 will be maintained in its lower or retracted position. When the carrier 65 is again returned to its vertical or operative position shown in Fig. 4, the spring 88 serves to impart clockwise movement to the shaft 78 when the cams 85 have been moved into the enlarged portions 84' of the slots 84. This returns the locating structure 105 to its upper position, as shown in Fig. 4, so that the blank W is in a position to have the desired heating and forging operations performed thereon. It will be observed that the forging stroke of the work holder is accomplished as herein shown by upward movement of the plunger 115 with respect to the locating structure 105, and such actuation of the plunger 115 is attained by a piston 160 which is freely mounted within the cylinder 66 for upward actuation when air is admitted through an inlet connection 161 disposed at the lower end of the cylinder 66. When the piston 160 is thus actuated, a reduced upper end 160' on the piston is driven through an opening 162 in the bottom plate 117 and with a hammer-like blow against the lower end of the plunger 115.

The electrodes 100 must, of course, be engaged with the opposite edge surfaces of the work blank W in order to effect the desired heating of the work blank, and yet these electrodes must be separated from the work blank prior to the forging operation in order that the upward movement of the work blank W and the work holder 44 will not cause damage to the adjacent ends of the electrodes. The electrodes 100 are therefore mounted in alignment on opposite sides of the housing 35 for longitudinal approaching or separating movement, and to this end each electrode 100 comprises an outer supporting sleeve 165 which is slidable longitudinally in a complemental bore 166 formed in the body which affords the housing 34, as will be evident in Figs. 5 and 6 of the drawings. Within each supporting sleeve 165 an insulating sleeve 167 is positioned and the current carrying member 168 of the electrode is extended through the insulating sleeve 167 and is held in place therein in a longitudinal sense by threads 169 which engage complemental internal threads formed within the insulating sleeve 167. The insulating sleeve is held against rotation with respect to the supporting sleeve 165 by means such as a pair of pins 170 which extend through the sleeve 165 and engage grooves in the opposite outer faces of the insulating sleeve, as shown in Fig. 8 of the drawings. The current carrying member 168 of each electrode is formed from a material such as copper which has a relatively low resistance to the flow of current, but at the ends of the electrodes where the work piece W is to be engaged, the electrodes are provided with separately made plates 172 which are made from a material such as berylium copper which has a relatively high coefficient of electrical conductivity and a relatively high melting point. The pure copper members 168 are extended beneath the plates 172 as indicated at 173 thereby to provide for conduction of the electricity to the point of contact with the work blank W with the minimum of electrical resistance.

Because of the relatively high temperatures which are to be produced in the work blanks W by the electrical heating means, provision is herein made for cooling the electrodes 100 constantly during the operation of the machine. This is accomplished in the present construction through the provision of a bore 175 which is extended inwardly from the outer end of each electrode 100. The bore 175 terminates in spaced relation to the inner end of the electrode, and a somewhat smaller tube 176 is extended into the bore 175. The tube 176 is supported at its outer end in a modified T-fitting 177 which has one enlarged nipple 178 thereof threaded into the enlarged and threaded end of the bore 175. The tube 176 is extended through the nipple 178 in spaced relation to the internal surfaces of this nipple, and is extended into the opposite nipple 179 so as to afford a water tight connection from the nipple 179 into the tube 176. The opposite nipple 179 of the T-fitting is arranged to receive a hose coupling 180 so that water may enter the hose coupling 180 and pass directly into the tube 176. The tube 176 is so supported that its inner end is spaced from the inner end of the bore 175 so that such water may then pass in a reverse direction through the annular passage formed within the bore 175 and about the tube 176. This water then enters the end of the nipple 178 about the outside of the tube 176 and passes to a lateral discharge opening 182 and out of a hose coupling 183 which is associated with the outlet 182 by means including a nipple 184. Thus a constant flow of a cooling liquid such as water may pass into the hose coupling 180 and through the tube 176 to a point adjacent to the inner end of the electrode and this water may then discharge through the coupling 183.

The electrodes 100 must be actuated in each operative cycle of the machine and the means for accomplishing such actuation are under the present invention of such a character that the electrodes are maintained in either their separated or their active positions until another positive actuation is imparted thereto. In attaining such operation a pair of actuating arms 190 are provided for the electrodes 100, the actuating arms 190 being disposed in horizontal positions so as to extend in a direction from front to rear of the machine. The arms 190 are pivoted at their rear ends on vertical pivot bolts 191 which are extended through pivot bearings 192 on the rear ends of the arms and downwardly through spacing members 193 which rest upon the upper surface of the mounting plate 39. The bolts 191 are extended downwardly through the mounting plate 39 and nuts 195 are fixed on lower ends of the bolts to hold the spacing and supporting members 193 in the desired upright positions. The forward ends of the arms 190 are provided with forks 196, as shown in Figs. 3, 5 and 8, and the forks 196 are engaged with transverse grooves 197 formed on the enlarged outer ends of the supporting sleeves 165. The engagement of the forks 196 with the supporting sleeves 165 is such that the sleeves 165 are held against rotation, thereby to insure proper engagement of the plates 172 of the electrodes with the work blanks W. The engagement of the forks 196 with the supporting sleeves 195 serves to support the forward ends of the arms 190.

With the foregoing arrangement it will be evident that the electrodes 100 may be actuated in unison by simultaneous and similar actuation of the two arms 190 in opposite directions. This is accomplished under the present invention by a cam mechanism 200 which is preferably actuated by piston and cylinder means. As herein shown these means comprise a cylinder 201 having a piston 202 therein from which a piston rod 203 extends in a forward direction. The cylinder 201 is supported by means including a pair of end plates 204 which, as shown in Fig. 12 of the drawings, are in the nature of angle plates secured by bolts 205 to upstanding mounting members 206 carried on the mounting plate 39. The mounting of the cylinder 201 is such that the axis of the piston rod 203 is horizontally disposed in substantially the plane of the two arms 190 and substantially midway between these two arms. Thus a cam member 210 supported on the forward end of the piston rod 203 is adapted to extend between a pair of cam rollers 211 mounted on inwardly extending portions 212 of the arms 190, and springs 213 extended between the vertical mounting axles 214 of the rollers 211 serve to maintain the cam rollers 211 in engagement with the cam 210. The cam 210 is generally conical in form, and as shown in Fig. 3, the cam is disposed so that this conical portion tapers in a forward direction. At its forward end the conical surface merges with a cylindrical dwell surface 216, and when this dwell surface is disposed between the two rollers 211 the springs 213 may act to urge the forward ends of the arms 190 together to such an extent that the inner ends of the electrodes 100 will engage the opposite edges of a work blank W. When the cam 210 is actuated in a forward direction, the conical portion of the cam 210 serves to separate the two arms 190 so as to thereby impart similar separating movement to the electrodes 100, and at the end of such a forward stroke another cylindrical dwell surface 217, which is of a greater diameter than the dwell surface 216, is brought into alignment with the cam rollers 211. Thus the arms 190 are maintained in their separated positions, and the action of the springs 213 is ineffective to cause undesired longitudinal movement of the cam 210 even though the actuating force is removed from the rear face of the piston 202.

The pressure fluid for actuating the piston 202 in a forward direction may be supplied to the rear end of the cylinder 201 by an inlet connection 220 and a similar inlet connection 221 is also provided at the forward end of the cylinder 201 for supplying pressure fluid to the forward end of the cylinder.

The electrical connections to the two electrodes 100 are provided in part by connecting bands 225 which are clamped about the conducting members 168 adjacent to the outer ends thereof, and flexible electric wires, preferably in the form of flexible coils 226, are extended downwardly and are associated with connector bolts 227. These connector bolts 227 are extended through opposite ends of an insulating bar 228 which, as shown in Figs. 3, 4 and 5, is extended across the two portions 36a of the standards just forwardly of the mounting plate 39, and further electrical connections are extended to the bolts 227 in a manner which will hereinafter be described.

During the heating of a work blank W in the heating chamber 35 it is desirable to prevent oxidation or other undesirable changes in respect to the metal of the work blank, and this may be accomplished through the provision of an inert atmosphere within the chamber 35. I have discovered however that the atmosphere within the chamber 35 may be of such a character that it would not ordinarily be termed inert, the governing factor in this regard being that the atmosphere within the chamber 35 must be such that during the required heating period it will not cause or permit any undesired change in the metal. Thus, where a relatively short heating period on the order of but two or three seconds is required, I have found that ordinary illuminating gas may be used to provide the necessary protection for the work blank. It will be noted, of course, that such illuminating gas contains carbon, and that it therefore has a tendency to carburize the blank, but in the short heating period involved in the use of the present machine, such carburizing action is negligible and unobjectionable.

For the purpose of supplying and passing such gas through the heating chamber 35, an entry passage 230 is provided in one side of the mounting sleeve 46 near the base thereof, and, as shown in Fig. 5, this entry passage 230 is arranged to meet a vertical extending groove 231 formed in the inner surface of the sleeve 46 beneath the shoulder upon which the plate 52 rests. If desired, the cross sectional area of the groove 231 may be augmented by a matching groove 282 formed in the edges of the plates 52, 53 and 55. The gas may thus enter through the entry passage 230 and may pass downwardly into the heating chamber 35, and this gas may then pass on through the chamber 35 and out of an outlet passage which includes a groove 233 and a bore 234. The groove 233 is formed in the opposite side of the inner surface of the sleeve 46 in the same position as the groove 231, and the bore 234 is extended into the sleeve 46 on the left hand side thereof as viewed in Fig. 5. The cross sectional area of the groove 233 may be augmented by a similar groove formed in a matching relation in the edges of the plates 52, 53 and 55.

Since the present embodiment of the machine contemplates the use of a dangerous gas such as illuminating gas to protect the heated work blanks, means must be provided for disposing of such gas after it has passed through the chamber 35, and this is accomplished under the present invention by a burner 236 which is extended upwardly from the outlet passage 234. Thus by burning the exhaust gases in the burner 236 an indicating flame is provided which will inform the operator as to whether or not the desired flow of gas is passing through the heating chamber 35. It will be observed, however, that during the loading and unloading operations the bottom of the chamber 35 will be open, and for this reason provision is made for shutting off the flow of gas through the chamber 35 during the loading and unloading periods. Because of the turning off and on of the gas flowing to the burner 236, a pilot burner 237 is mounted beside the burner 236 and a continuous supply of gas is furnished from a main source 238 and through a cut-off and adjusting valve 239 and a pipe 240 so that the pilot burner 237 may operate continuously. Gas is supplied to the inlet passage 230 through a branch conduit extended from the source 238 through a cut-off and adjusting valve 241 from which the conduit extends as at 242 to a second cut-off valve 243. A pipe 244 extends from the valve 243 to the inlet 239, and during the operation of the machine, the valve 243 is closed whenever the work holder 44 is moved to its loading position and is opened whenever the work holder 44 is returned to its operating position.

Such operation of the valve 243 is, under the present invention, accomplished automatically, and in the embodiment herein shown such automatic operation is attained through operative connection of the valve 243 with the locking shaft 78. Thus, as shown in Figs. 3, 10, 11, 12 and 13, a transmitting shaft 245 of tubular form is pivoted at 246 to the valve member of the valve 243 and the shaft 245 is extended upwardly and forwardly and is connected to the shaft 78. In accomplishing such connection an annular bearing bracket 247 has one of its ends mounted in surrounding relation upon the left hand end of the locking shaft 78 and is held in position by a bevel gear 248 which is pinned on the end of the shaft 78. The other arm of the bearing bracket 247 has a bevel gear 249 mounted thereon so that the gear 49 is meshed with the bevel gear 248. The bevel gear 249 is carried upon a shaft 250 which extends into the sleeve shaft 245 in a slidable relation, and the shafts are drivingly connected by a pin and slot connection 251 which is best shown in Figs. 12 and 13. Thus when the locking shaft 78 is rotated through an unlocking movement, the shaft 245 is rotated so as to move the valve member of the valve 243 to its closed position which is shown in Fig. 13 and in which the axis of the pivot 246 is disposed parallel to the rocking axis 70 of the carrier 65. When this relationship has been established, the work holder 44 and the carrier 65 may be tilted forwardly and during such movement the shaft 245 pivots about the axis 246 and the shaft 250 is telescoped downwardly to a greater extent within the sleeve shaft 245 as will be evident upon a comparison of Figs. 12 and 13. Thus, as the carrier 65 is unlocked, the flow of gas through the chamber 35 is cut off, and because of the fact that the shaft 78 cannot be rotated in a return direction after the work holder 44 has been withdrawn in a forward direction, the supply of gas to the chamber will necessarily remain cut off until the work holder 44 has been returned to its operative position. When this is done the locking shaft 78 is operated through a locking movement by its spring 88 so that the valve 243 is again operated to its open position. The gas therefore flows through the chamber 35 and when this gas reaches the burner 236 it is ignited by the flame which is present at the pilot burner 237.

The pressure air for actuating the piston 202 of the cylinder 201 is supplied and controlled by two different valve means one of which comprises a manually operated valve 260 which is mounted on the forward right hand portion of the table top 32 as shown in Figs. 1, 2 and 15. The valve 260 has an operating handle 261 which is urged to its right hand closed position as shown in Fig. 16 by means including a spring 262. Air is supplied to the valve 260 from any desired source by an inlet pipe 263 and when the valve 260 is opened by movement of the valve handle 261 to the left in Fig. 16, such air is conducted through a pipe 265 to the forward inlet connection 221 of the cylinder 201. Thus the piston 202 is forced to its rearward position shown in Figs. 3 and 19 to thereby withdraw the cam member 210 to such a position that the rollers 211 are engaged with the dwell surface 216 of the cam. When this is done the springs 213 draw the two arms 190 toward each other to thereby move the electrodes 100 into operative engagement with the opposite edges of a work blank W which is supported within the heating chamber 35. The handle 261 of the valve 260 is then allowed to return in a right hand direction to its closed or cut off position wherein it not only cuts off the supply of air from the inlet 263 but also connects the pipe 265 with a vent pipe 268 so as to permit venting of the forward end of the cylinder 201 when the piston is again actuated to its forward position.

Such forward actuation of the piston 202 is desired after the heating of the work blank has been completed and prior to the actuation of the hammer or piston 160, and air is supplied to the rear end of the cylinder 201 under the control of a normally closed cut-off valve 270 disposed within the base 31. The valve 270 is supplied with pressure air by a pipe 271 which is extended from a supply tank 272 located within the base 31, and as herein shown this supply tank 272 is maintained at a substantially constant pressure by means of a pressure reducing valve 273 which is interposed between pipe sections 274 and 275 which lead from a suitable source to the supply tank 272. If desired, a pressure gauge 276 disposed above the table top 32 may be associated with the low pressure side of the pressure reducing valve 273 in the general manner indicated in Fig. 17. The outlet of the valve 270 has a T-fitting 278 connected thereto. A flexible hose coupling 279 connected to one branch of the T-fitting 278 is extended upwardly through the table top 32 and is connected to the rear inlet 220 of the cylinder 201. The other branch of the T-fitting 278 is connected by a flexible hose coupling 280 to the lower inlet opening 161 of the cylinder 66 so that when the valve 270 is opened, pressure air is supplied through the hose 279 to the rear end of the cylinder 201 and through the coupling hose 280 to the lower end of the cylinder 66. The valve 270 has a projecting stem 282 which may be pressed inwardly to open the valve. The valve operating stem 282 is, in the present case, actuated by a solenoid 283 which is mounted on the top of the supply tank 272 and has its armature 284 connected to one end of a lever 285. The lever 285 is pivoted at its intermediate ends on a bracket 286 which is carried on the valve 270, and the other end of the lever 285 is arranged for engagement with the valve operating stem 282. Thus, when the solenoid 283 is energized, the stem 282 is pressed inwardly and the valve 270 is opened, and pressure air is supplied to the rear end of the cylinder 201 and to the lower end of the cylinder 66. With the arrangement thus described the rear end of the cylinder 241 is constantly connected through the hoses 279 and 280 to the lower end of the cylinder 66, and hence when the piston 202 is actuated in a rearward direction, the air within the rear end of the cylinder 201 is vented by forcing this air into the lower end of the cylinder 66. Such air tends to lift the piston or hammer 160, but the rate of flow is such that the piston 120 is not operated through a forging stroke at this time. Hence the air merely escapes at a relatively slow rate about the piston 160 and passes out of exhaust openings 288 formed in the sides of the cylinder 66 adjacent the upper end thereof. This arrangement therefore functions as a dashpot to prevent too rapid approaching movement of the electrodes 100.

When the valve 270 is opened to cause separation of the electrodes 100 and operation of the hammer 160, the present apparatus operates to attain the requisite timed relation of these operations, for it will be clear that separation of the electrodes starts immediately upon forward movement of the cam 210, while upward movement of the work holder does not start until the upward stroke of the hammer 160 is substantially completed. To afford additional clearance, however, the portions 173 of the electrodes are cut away on a gradual taper 173A on their lower faces as shown in Fig. 5.

The operation of the solenoid 283 is desired only after the heating of a blank W has been completed, and this solenoid is therefore placed under the control of timing mechanism generally designated as 290 in Fig. 19 of the drawings. This timing mechanism is diagrammatically shown in the present instance, and is arranged to start through its timing cycle under the control of the manual valve handle 261 so that the operating cycle of the machine is manually initiated, and such timing cycle is automatically terminated by the timing mechanism 290. As herein shown the timing mechanism 290 is mechanical in character and includes a timing shaft 292 upon which a constantly driven pulley 293 is loosely mounted. The pulley 293 is driven by a belt connection 294 from a synchronous motor 295, and when a timing cycle is desired, the shaft 292 is connected to the pulley 293 by means such as a one-revolution clutch 296. This clutch may be of general construction shown in the patent to Gollwitzer, No. 2,265,133, patented December 9, 1941. As herein shown, the clutch 295 includes a driving member 297 fixed on the pulley 293 and a driven member 298 fixed on the shaft 292 for relative sliding movement in a longitudinal direction so that opposed teeth on the adjacent ends of the driving and driven members may be engaged by movement of the driven member 298 in a left hand direction from the position shown in Fig. 19. The driven member 298 is constantly urged toward an engaged relation by a spring 299 which surrounds the shaft 292 and acts between the driven member 298 and a collar 300 fixed on the shaft 292. The driven member 298 has a stop pin 301 projecting radially therefrom and in the rotation of the driven member this pin is adapted to engage a cam surface formed on a stop lever 302 so as to shift the driven member 298 to the right in Fig. 19 to thereby disengage the clutch. The stop lever 302 normally rides against the outer surface of the driven member 298 so as to release the clutch at a predetermined point in the rotation of the driven member, and such rotation of driven member 298 is stopped at a predetermined point by engagement of the pin 301 with a stop finger 303 formed on the stop lever 302. The stop lever 302 is pivoted intermediate its ends on a pivot 304, and the other end of the stop lever is connected to the armature 305 of a solenoid 306, so that when the solenoid 306 is energized the stop lever 302 will be pivoted so as to release the pin 301 and permit closure of the clutch 296. This institutes the desired timing period or cycle, and during this cycle the solenoid 306 is deenergized so as to return the stop lever 302 to its active position, thereby to cause the clutch 296 to be open at the end of a one-revolution timing cycle.

The electrical elements of the present machine are energized from line wires L1 and L2, Fig. 19, which carry a suitable alternating current. The line wire L1 is connected by a wire 310 to one terminal of the motor 295 while the other terminal of the motor is connected by wires 311 and 312 in series to one terminal of a main switch 313, the other terminal of which is connected to the line wire L2. Thus when the main switch 313 is closed the motor 295 operates continuously so as to thereby render the timing mechanism 290 available at any time to initiate and control an operative cycle of the machine. Such a timing cycle of the timing mechanism 290 is initiated by energization of the solenoid 306 and to this end the line wire L1 is extended so as to connect with one terminal of the solenoid 306. The other terminal of the solenoid 306 is connected by a wire 315 to one contact of a normally open switch 316, the other terminal of which is connected to the wire 311. Thus by closure of the switch 316 the solenoid 306 may be energized, and the switch 316 is arranged for operation by the manual starting handle 261. Thus, as shown in Figs. 16 and 19, the starting handle 261 has an arm 318 fixed thereto so that it is moved with the handle 261, and when the handle 261 is moved to the left in Fig. 16 a roller 319 carried on the arm 318 is arranged to engage a cam surface 320 formed on a switch operating lever 321. The switch operating lever 321 is pivoted at 322 on the housing 316A of the switch 316 and when the cam surface 320 is engaged by the roller 319, the lever 321 engages a projecting plunger 324 so as to press the same inwardly of the housing 316a and thereby close the switch 316. The arrangement of the arm 318 with respect to the valve 260 is such that the roller 319 does not strike the cam surface 320 so as to close the switch 316 until after the valve 260 has been opened and has caused rearward actuation of the cam 210. Thus the electrodes 100 are moved into contact with the work blank W prior to the time when the timing mechanism 290 causes the electrodes 100 to be energized.

The timing mechanism 290 operates to control such energization of the electrodes 100 and in addition, the timing mechanism serves to govern the energization of the solenoid 283 which in turn controls the separation of the electrodes 100 and the operation of the piston or hammer 160. In accomplishing such controlling operations the present timing mechanism 290 has a pair of cam discs 330 and 331 fixed upon the shaft 292 for rotation therewith. The cam disc 330 is arranged to actuate and control a normally open switch 332 which serves as the primary control for energizing the electrodes 100, while the cam disc 331 serves to actuate and control a normally open switch 333 which serves as the primary control for governing the energization of the solenoid 283.

Such control of the switch 332 by the cam disc 330 is attained by a relatively long cam lobe 330A formed on the cam disc 330. This cam lobe has its leading edge 330B arranged to engage and actuate the switch 332 soon after rotation of the timing shaft 292 is started. The length of the cam lobe 330A is of such a magnitude as to hold the switch 332 closed for the desired heating period, and at the end of this heating period the follower of the switch 332 rides off of the trailing edge 330B of the cam lobe 330A. The controlling action of the cam 331 on the switch 333 is attained by a cam lobe 331A which is arranged so that its leading edge 331B strikes the follower of the cam 333 soon after the switch 332 has been opened, thereby to assure that the electrodes 100 are deenergized prior to the time when separating movement is imparted to these electrodes. The cam lobe 331A is of such a length that the valve 270 is maintained open for a predetermined period which is sufficient to drive the hammer 160 through its forging stroke and to maintain the hammer in its upper position with the work blank engaged with the die for a short cooling period.

The energizing circuit for the electrodes 100 includes a transformer T, the secondary winding 335 of which is connected in circuit with the electrodes. Thus a wire 336 is extended from one terminal of the secondary winding 335 and is connected to one of the terminal bolts 227 while a wire 337 is extended from the other terminal of the secondary winding 335 to the other terminal bolt 227. With this arrangement the energization of the electrodes 100 is governed by switch means in the energizing circuit of the primary winding 338 of the transformer T. Thus as shown in Fig. 19 a wire 339 is connected from the line wire L1 to one terminal of the primary winding 338 of the transformer, while a wire 340 extends from the other terminal of the primary to one of the contacts of the normally open switch 332. The other contact of the switch 332 is connected by a wire 341 to the wire 331 so that energization of the transformer T and hence of the electrodes 100 is governed by the timing switch 332.

The energization of the solenoid 283 is governed primarily by the switch 333, but the circuit for the solenoid 283 also includes a safety switch 342 which is open at all times except when the work holder 44 is locked in its operative position. Thus, one contact of the switch 333 is connected to the wire 339 by a wire 343, thereby to establish circuit to the line wire L1, and the other contact of the switch 333 is connected by a wire 334 to one terminal of the solenoid 283. The other terminal of the solenoid 283 is connected by a wire 345 to one contact of the switch 342 while the other contact of the switch 342 is connected to the wire 341 by a wire 346. The switch 342 is of the mercury tube type and this switch is mounted on a holder 347 carried on the outer end of a stub shaft 348 extended through the web portion of the right hand standard 36. The stub shaft 348 has a bell crank fixed on the inner or left hand end thereof, as viewed in Fig. 11, and this bell crank has a downwardly projecting arm 349, Fig. 14, upon which a spring 350 is operative to normally tend to rotate the shaft 348 in a clockwise direction as shown in Fig. 14. Such rotation is limited by a stop pin 351 which is extended inwardly from the inner surface of the right hand standard 36 so as to lie in the path of the other arm 352 of the aforesaid bell crank. When the arm 352 is in the position indicated by dot-dash lines in Fig. 14 the switch 342 is in its open position. The switch normally tends to occupy this open position and is arranged to be closed by the locking shaft 78 when this shaft is rotated to its locking position. Thus, as will be evident in Figs. 10, 11 and 14, the shaft 78 has an arm 355 fixed thereon, as by clamping about the hub of the right hand locking cam 85, and when the locking shaft 78 is operated in a clockwise direction to the position shown in Fig. 14, an arm 355 engages the arm 352 to shift the switch 342 to its closed position. Hence it will be clear that if the work holder is located forwardly of its operative position or is not properly locked in this operative position, the switch 342 will be open and it will be impossible to energize the solenoid 283. When this dangerous condition exists, the disabling of the energizing circuit of the solenoid 283 serves to disable the hammer mechanism of the machine, and hence the parts of the machine cannot be injured by inadvertent operation of the hammer means.

The cooling liquid such as water for cooling the two electrodes 100 is supplied from a supply pipe 360 which is connected through a valve 361 and a pipe 362, Figs. 2 and 19, to a header pipe 363 which is extended along the back of the base 31 as will be evident in Fig. 17 of the drawings. The valve 361 has an operating handle 364 which is preferably interlocked as indicated at 365 with the main switch 313 so that the switch 313 cannot be closed until the valve 361 has been opened. This assures that the cooling liquid will be flowing in the electrodes 100 prior to the energization of these electrodes. The header pipe 363 is connected by flexible hoses 366 and 367 to the respective inlet connectors 180 of the electrode cooling circuits so that a coolant such as water is supplied to the central tubes 176 of these electrodes. After such water has passed through these electrodes it is of course discharged from the two connectors 183 and such discharged water or other coolant is carried away by hoses 370 and 371 which are associated with the respective discharge outlets of the two electrodes 100. In the present case where the coolant is relatively cheap, these discharge tubes 370 and 371 are arranged to discharge into a drain pipe 373 and means are provided whereby a sight feed is afforded between the tubes 370 and 371 and the drain pipe 373. In the present instance the sightfeed arrangement 375 comprises an upstanding bracket 376 having a pair of discharge pipes 377 extended therethrough and having the hoses 370 and 371 connected respectively to the two discharge pipes 377. The discharge pipes 377 are directed downwardly into a funnel 378 which is arranged to discharge into the drain 373. The lower ends of the discharge pipes 377 are spaced upwardly from the funnel 378 so that the streams of water or other coolant passing from the pipes 377 into the funnel 378 are clearly visible at all times. Thus the operator may readily check the presence or absence of the desirable flow of coolant through the electrodes 100.

In the use of the present apparatus the operator first turns on the supply of coolant by opening the valve 361, as indicated at 380 in the timing chart which forms Fig. 22 of the drawings. This starts the flow of a cooling liquid such as water through the cooling passages of the electrodes 100 and the operator may immediately check the presence or absence of such flow by looking at the sight feed device 375. The opening of the valve 361 releases the mechanical interlock 365 so that the main switch 313 may then be closed. It will be observed that this switch closure is not indicated on the timing chart, since such switch closure is related by the interlock to the opening of the valve 361 and cannot be performed until after the valve has been opened. Closure of the main switch 313 closes the circuit to the motor 235 of the timing mechanism 290 so that the pulley 295 is constantly rotated. The gas supply is then turned on and regulated, as indicated at 381 and 382 in Fig. 22, by opening of the cut off valves 239 and 241, and the gas will of course flow at once to the pilot burner 237 where such gas is lighted, and in the event that the heating chamber 35 is closed at this time, the valve 243 will also be open and gas will also flow to the burner 236 so as to be lighted by the flame at the pilot burner 237. The source of pressure air supply is also turned on by any preferred control means so that the supply tank 272 is charged to a predetermined pressure which is adjustably determined by the pressure reducing valve 273.

The machine is now in condition for operation, and as the first step in a work loading operation, the operator turns the handle 89 in an unlocking direction, that is in a clockwise direction as viewed in Fig. 15, to thereby unlock the carrier 65 as indicated at 383 in Fig. 22. This brings the flat portions 85' and 85" of the locking cams 85 into substantial alignment with the outer sides of the slots 84. Such unlocking movement of the locking shaft 78 serves through the gears 155 and 157, Figs. 4 and 11, to withdraw the positioning structure 105 in a downward direction, as indicated at 384 in Fig. 22, thus to position the work holder in a lower or retracted position wherein a work blank W mounted therein will clear the lower edge 102 of the front wall 103 of the heating chamber. The unlocking movement of the locking shaft 78 also serves through the lever 355 to release the shaft 348, Fig. 14, for movement to its dotted line position of Fig. 14, and this tilts the safety switch 342 to its open position as indicated at 385 in Fig. 22, so as to prevent operation of the hammer mechanism so long as the locking shaft 78 remains in its unlocked position.

The movement of the locking shaft 78 through an unlocking movement, as aforesaid, serves also to close the valve 243, as indicated at 386 in Fig. 22, this being accomplished through the gears 248 and 249 and the connecting shafts 245 and 250 shown in Figs. 12 and 13 of the drawings. Such closure of the valve 243 serves to cut off the flow of gas through the heating chamber 35, thereby to enable the operator to safely open the heating chamber.

It will be recognized that at the end of the previously performed forging operation, the cam 210 will have been actuated to its forward position so that the cam rollers 211, Fig. 3, will be positioned in engagement with the wide dwell surface 217 of the cam. Thus the electrodes 100 will at this time be separated, as indicated at 387 in Fig. 22, so as to be conditioned for the withdrawing movement of a work piece which may be held in the work holder 44 and for movement of another work blank into position between the electrodes as will hereinafter be described. In addition, the electrodes 100 are deenergized, as indicated at 388 in the timing chart.

After the locking shaft 78 has been thus moved through an unlocking movement, the spring 75, Fig. 4, operates upon the carrier 65 to shift the carrier to its loading position of Fig. 13, at the time indicated at 389 in Fig. 22, and in this position the work holder 44 is located forwardly of the front wall 103 of the heating chamber and in a readily accessible position so that a work blank piece may be readily placed in the work holder or removed therefrom. When the work holder 44 has thus been located in its loading position, the handle 101 is shifted to the left from the position shown in Fig. 3 so as to operate through the gears 135 and 136, Fig. 10, to rotate the actuating sleeve 130 in a counterclockwise direction as viewed in Fig. 10. This rotative movement acts through the threads 133 and 134 to shift the sleeve 130 in an upward direction, thereby to release the chuck jaws 95 and 96, as indicated at 390 in the timing chart, and thus permit withdrawal of a work piece which may have been clamped therein. The new work blank W is then inserted into the jaws 95 and 96 and the handle 101 is shifted to the right, thereby to rotate the sleeve 130 and cause downward movement thereof relative to the chuck jaws. This serves to clamp the chuck jaws 95 and 96 upon the work blank W at substantially the time indicated at 391 in the timing chart.

The carrier 65 is then tilted back toward its upright position against the opposing force of the spring 75, at the time indicated at 393 in Fig. 22, and when this vertical or operative position of the carrier 65 has been reached, the torsion spring 88 operates automatically to rotate the locking shaft 78 in a clockwise direction, Figs. 4 and 15, thereby to lock the carrier in its operative position, as indicated at 394 in the timing chart. When the carrier 65 is in its operative position, it will be noted that the rear edge of the plate 140 is in abutment with the stop plate 74, while just forwardly of the stop plate 74 the upper face of the plate 140 is in firm abutment with the lower edge of the rear wall of the housing 34. Similarly, the top surface of the plate 140 just forwardly of the stop holder 44 is also in abutment with the lower edge surface of the forward wall 103 of the housing 34, thereby to close the heating chamber 35. Such effective closure of the heating chamber 35 is attained in the present instance by reason of the relationship of the top and rear surfaces of the carrier 65 to the axis of the mounting shaft 70. Thus it will be noted that the rear face of the plate 140 lies in a plane passing through the axis of the shaft 70, while the plane of the top of the plate 140 is parallel to the axis of the shaft 70 and is perpendicular to the aforesaid radial plane.

The rotation of the locking shaft 78 as aforesaid to its locking position serves also to open the gas valve 243, to thereby start the flow of gas through the heating chamber 35 as indicated at 395 in Fig. 22 of the drawings, and when such gas passes from the chamber 35 to the burner 36, it is ignited by the pilot flame so as to indicate to the operator that the chamber 35 has been filled with a protecting gas. At this same time, as indicated at 396 in the timing chart, the work holder 44 is raised to its upper or active position. The operation of the locking shaft 78 to its locking position serves also to close the safety switch 342 as indicated at 397 in Fig. 22 of the drawings.

The foregoing operations constitute the loading operations which are entailed in the use of the present machine, and when such loading operations have been completed, the machine is in condition for operation through its heating and forging cycle. Such a heating and forging cycle is initiated by movement of the starting handle 261 from its right hand position to its left hand position, and this may be done immediately after the completion of the loading operations, as indicated at 398 in Fig. 22. As the handle 261 is moved to the left, the valve 260 is opened, as indicated at 399 in Fig. 22, thereby to supply air to the forward end of the cylinder 201 and cause the electrodes 100 to be moved together so as to be clamped against opposite side edges of the work blank W which is supported within the heating chamber 35. Such approaching movement of the two electrodes is governed as to speed by the dash-dot action of the cylinder 66. Thus the two electrodes are engaged with the work blank W at a time indicated at 400 in Fig. 22.

Continued movement of the handle 261 to the left causes the starting switch 316 to be closed at a time indicated in 401 in the timing chart, and closure of the switch 316 energizes the starting solenoid 306 of the timing mechanism 290. Thus the clutch 296 of the timing mechanism is released for engagement so as to operate the timing mechanism 290 through its one-revolution timing cycle. In the course of this timing cycle, and soon after the electrodes 100 have been engaged with the work blank W, the timing cam 330 operates by reason of its cam lobe 330A to close the switch 332, and thus the transformer T is energized so that current flows from the secondary 335 thereof to the two electrodes 100 and through the upper end of the work blank W. In the present instance the work blank is heated by what is termed resistance heating, and hence the current supplied to the electrodes 100 has a relatively low voltage and a relatively high amperage. Thus the electrodes 100 are energized at a time indicated at 402 in the timing chart. After the starting handle 261 has been moved as aforesaid to its left hand position, this handle is released and is returned to its right hand position by the spring 262, as indicated at 403 in Fig. 22, and this causes the starting switch 316 to be opened as indicated at 404 in the timing chart. The right hand movement of the starting handle 261 then causes the valve 260 to be closed at a time indicated at 405 in Fig. 22, and it is to be noted that when the valve 260 is closed, the forward end of the cylinder 201 is connected to the vent 268. The piston 202, however, remains in its rear position because the rollers 211 are at this time located opposite or are engaged with the dwell surface 216 of the cam 210. The opening of the starting switch, as indicated at 404, has no effect upon the timing mechanism 290 since this mechanism operates through its one revolution cycle by virtue of but a momentary actuation of the solenoid 306. Thus the heating and forging cycle of the apparatus has been started, and the length of this cycle is determined by the length of the cam lobes on the cams 330 and 331. During this cycle the operator may watch the progress of the heating operation through a window 410 which is provided in the front wall 103 just forwardly of the position in which the work blank W is supported, and to facilitate such inspection the forward portion of the master die holder 43 is cut away at 411 so that the operator may view the work blank by looking downwardly and rearwardly through the window 410.

The length of the heating period is, of course, governed by the length of the cam lobe 330A, and for producing work such as that shown in Figs. 20 and 21, a heating period of somewhat over two seconds is usually found to be satisfactory. The length of this heating period also may be varied in accordance with the amount of current passed through the work blank or with the size and other characteristics of the work blank. At the end of the heating period, the follower on the switch 332 rides off of the end 330B of the cam 330, thereby to open the switch 332 and deenergize the electrodes 100 at substantially the time indicated at 414 in the timing chart. Soon after the electrodes 100 have thus been deenergized, the leading edge 331B of the cam lobe 331A engages the follower of the switch 333 so as to close this switch, at substantially the time indicated at 415 in the timing chart, and since the safety switch 342 is closed at this time, this energizes the air valve solenoid 283 so as to open the valve 270 at substantially the time indicated at 416. This supplies air to the rear end of the cylinder 201 and to the lower end of the cylinder 66, with the result that the electrodes 100 are separated at substantially the time indicated at 417 in Fig. 22. At this same time the piston or hammer 160 is being actuated in an upward direction, as indicated at 418 in Fig. 22, and such upward movement of the hammer 160 causes the hammer to strike the plunger 115 so as to drive the work holder 44 toward the master die 50 with a forging stroke. This results in the formation of the desired surfaces on the heated upper end of the work blank W. The length of the cam lobe 331A is such that the air valve solenoid 283 is maintained energized for a short period on the order of a tenth of a second, as indicated at 419 in the timing chart, and at the end of this time the cam lobe 331A passes beyond the follower of the switch 333 so that this switch is then opened as indicated at 420 on the timing chart. At this same time the air valve 270 is closed as indicated at 421 on the timing chart.

During the time when the valve 270 is maintained opened, the piston or hammer 160 is continuously urged in an upward direction by the air flowing into the lower end of the cylinder 66, and after the hammer has forced the plunger 115 upwardly, the lower end of the piston 160 is located somewhat above the lower edges of the lateral vents 288. When this relationship has been established, the air continues to flow into the cylinder 66 at the bottom thereof and out of the uncovered portions of the vents 288. This air flow is sufficient to maintain the piston 160 in its upper position so as to maintain the work blank W in contact with the master die 50 so long as the air valve 270 is maintained opened. Upon closure of the air valve 270, as indicated at 421 in the timing chart, the piston or hammer 160 starts to move downwardly as indicated at 422 in Fig. 22 and this movement progresses steadily as the air within the lower end of the cylinder 66 leaks gradually by the sides of the piston 160 and upwardly toward the outlets or vents 288.

The forging of the blank W has now been completed and if desired the operator may watch the progress of the cooling of the work blank through the window 413. When this cooling has progressed to a sufficient extent, the locking shaft 78 is moved through an unlocking movement as indicated at 424 in the timing chart. Such operation of the locking shaft 78 turns off the gas valve 243 to thereby stop the flow of gas through the heating chamber 35, as indicated at 425, and it also results in lowering of the work holder 44, as indicated at 426. The operation of the locking shaft 78 to its unlocked position also serves to open the safety switch 342 at the time indicated at 428 in Fig. 22. The release of the locking means, as aforesaid, by operation of the locking shaft 78, causes the spring 75 to act to shift the carrier 65 to its withdrawn position, and this shifting movement may take place immediately or soon after the operation of the locking shaft as indicated at 429 in Fig. 22. Thus the work holder 44 is located in its accessible loading position, and the handle 101 is therefore operated to the left so as to unclamp the jaws 95 and 96 of the chuck, as indicated at 430 in the timing chart, and the operator may then withdraw the forging work piece and may substitute a new work blank so that the cycle of operations hereinbefore described may be repeated.

From the foregoing description it will be apparent that the present invention enables punches, dies and the like to be economically produced, and it will also be evident that the operation of the present apparatus is rapid, simple and extremely safe. The apparatus of this invention is such that the operator may constantly verify the presence or absence of essential operating conditions in the machine, thereby to avoid waste of time and materials when the machine does not operate properly. The present machine forms the operating surfaces of the punches and dies with unusual accuracy so that these surfaces are free from defects, and as a result these working surfaces of the punches and dies have an unusually long useful life.

Thus, while I have illustrated and described the preferred embodiment of my invention, it is to be understood that it is capable of variation and modification and I therefore do not wish to be limited to the precise details set forth, but desire to avail myself of such changes and alterations as fall within the purview of the following claims:

I claim:

1. In a forging apparatus for forming punches, dies and the like, a work holder having work engaging means thereon and a master die holder disposed in an opposed and spaced operative relation and supported for relative approaching movement through a forging stroke and for relative lateral displacement to expose the work engaging means of said work holder for work-loading or unloading operations, means associated with one of said holders and adapted to cooperate with the other of said holders to afford a heating chamber including the space between said holders, means for heating a work blank in said work holder, and means operable after such a blank has been heated to effect relative movement of said holders through a forging stroke.

2. In a forging apparatus for forming punches, dies and the like, a work holder having work engaging means thereon and a master die holder disposed in an opposed and spaced operative relation and supported for relative approaching movement through a forging stroke and for relative lateral displacement to expose the work engaging means of said work holder for work-loading or unloading operations, means associated with one of said holders and adapted to cooperate with the other of said holders to afford a heating chamber including the space between said holders, electrodes extended into said chamber for heating a work blank supported by said work holder within said chamber, means for shifting said electrodes into and out of contact with such a work blank, timing means, means controlled by said timing means for supplying a heating current to said electrodes for a predetermined heating period, and means controlled by said timing means and operable upon the conclusion of such a heating period to separate said electrodes and thereafter to effect relative movement of said holders through a forging stroke.

3. In a forging apparatus for forming punches, dies and the like, a die holder for supporting a master die and a work holder having a chuck for supporting a work blank in an operative position opposed to such a die, means associated with one of said holders and forming a heating chamber enclosing the space in which a work blank is disposed when it is in said operative position, means supporting said holders for relative approaching movement through a forging stroke and including means for shifting one of said holders in a direction laterally of the direction of said approaching movement to expose said chuck in a position wherein a blank may be removed from or inserted into the said chuck, hammer means for effecting such relative movement of said holders through a forging stroke, means extended into said chamber for heating a work blank supported in said chuck, means for actuating said hammer means, and means for operating said heating means and said hammer actuating means in timed relation.

4. In a forging apparatus for forming punches, dies and the like, an upstanding frame, a body supported on said frame and affording a heating chamber, a die holder mounted on an upper portion of said body and adapted to rigidly support a master die in a position wherein such a master die faces downwardly into said heating chamber, a carrier including an elongated cylinder and pivoted on said frame on a horizontal axis beneath said chamber for movement from an operative position wherein said cylinder is aligned with said die holder to an inoperative loading position wherein the upper end of said carrier is exposed in an upwardly and forwardly facing relation forwardly of said chamber, a work holder mounted on said carrier coaxially of and for limited longitudinal movement with respect to the cylinder and having an inner end facing downwardly within the cylinder, means urging said work holder downwardly of said cylinder, a piston within said cylinder constituting a hammer adapted in its upward stroke to engage said inner end of said work holder to drive the same through a forging stroke toward said die holder, means for heating a work blank supported in said chamber by said work holder, timing means for said heating means, and means governed by said timing means for supplying pressure fluid to said cylinder to actuate said piston through an upward stroke.

5. In a forging apparatus for forming punches, dies and the like, a pair of spaced upstanding frame members, a body supported on said frame members so as to span the space therebetween and affording a heating chamber, a die holder mounted on an upper portion of said body and adapted to rigidly support a master die in a position wherein such a master die faces downwardly into said heating chamber, a carrier including an elongated cylinder and pivoted on and between said frame members on a horizontal axis beneath said chamber for movement from an operative position wherein said cylinder is aligned with said die holder to an inoperative loading position wherein the upper end of said carrier is exposed in an upwardly and forwardly facing relation forwardly of said chamber, a work holder mounted in an exposed relation at the upper end of said carrier coaxially of and for limited longitudinal movement with respect to the cylinder and having an inner end facing downwardly within the cylinder, means urging said work holder downwardly of said cylinder, a piston within said cylinder constituting a hammer adapted in its upward stroke to engage said inner end of said work holder to drive the same through a forging stroke toward said die holder, heating means for heating a work blank supported in said chamber by said work holder and including a pair of shiftable electrodes extended into said chamber, pressure fluid operated means for shifting said electrodes into and out of contact with such a work blank, timing means for causing operation of said heating means through a predetermined heating period, and means governed by said timing means for supplying pressure fluid to said cylinder to actuate said piston through an upward stroke and to supply pressure fluid to said pressure fluid operated means to separate said electrodes prior to the time when said piston strikes said work holder.

6. In an apparatus for forging punches, dies and the like, a body affording a heating chamber, a support for supporting a master die within said chamber, a work blank support for positioning a work blank in an operative position within said chamber in opposed relation to a master die mounted in said die support, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, locking means for securing said carrier in an operative position with said work holder disposed in its position in said chamber, a pair of electrodes extending into said chamber, shifting means for separating said electrodes and maintaining the same separated during work loading and unloading operations, means for engaging said electrodes with a work blank after the blank has been moved into position in said chamber, means operable to energize said electrodes for a predetermined heating period after the electrodes have been thus engaged with the work blank to heat the work blank to a forging temperature and then to deenergize said electrodes, and means operable automatically upon deenergization of said electrode to operate said shifting means to separate said electrodes and to initiate operation of said hammer actuating means to operate said hammer means through a forging stroke.

7. In an apparatus for forging punches, dies and the like, a body affording a heating chamber, a support for supporting a master die within said chamber, a work blank support for positioning a work blank in an operative position within said chamber in opposed relation to a master die mounted in said die support, means for heating such a work blank, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, and locking means for securing said carrier in an operative position with said work holder disposed in its operative position in said chamber.

8. In an apparatus for forging punches, dies and the like, a housing affording a heating chamber, a support for supporting and positioning a master die within said chamber, a work blank support for positioning a work blank in an opertive position within said chamber in opposed relation to a master die mounted in said die support, means for heating such a work blank, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, locking means for securing said carrier in an operative position with said work holder disposed in its operative position in said chamber, and means operated by said locking means for disabling said hammer actuating means when said locking means is unlocked.

9. In an apparatus for forging punches, dies and the like, a body affording a heating chamber, a support for supporting a master die within said chamber, a work blank support for positioning a work blank in an operative position within said chamber in opposed relation to a master die mounted in said die support, means for heating such a work blank, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, locking means for securing said carrier in an operative position with said work holder disposed in its operative position in said chamber, and means operated by said locking means for disabling said hammer actuating means when said locking means is unlocked.

10. In an apparatus for forging punches, dies and the like, a chuck member for holding a work blank, a mounting member for supporting a master die for operative forging engagement with such a work blank, means supporting said members for relative approaching movement through a forging stroke, means affording a closed heating chamber about said chuck member and said mounting member, a carrier supporting said chuck member for withdrawing movement from its operative position within said chamber to a loading position outside of said chamber, means for locking said carrier with said chuck member in said operative position, a pair of movably mounted electrodes extended into said chamber and having active positions wherein they engage a work blank held by said chuck member and having inactive positions wherein said electrodes are separated from such a work blank, actuating means for shifting said electrodes back and forth between their active and inactive positions, a forging hammer for effecting relative approaching movement of said members through a forging stroke, means for actuating said hammer, means controlled by said locking means for disabling said hammer actuating means when said locking means is unlocked, timing means, starting means operable to control said electrode actuating means and said timing means to first shift said electrodes to their active positions and then to initiate operation of said timing means, means operable by said timing means upon initiation of the operation of said timing means to energize said electrodes for a predetermined heating period and then to deenergize said electrodes, means operable by said timing means to control said electrode actuating means and said hammer actuating means when said electrodes have been deenergized to separate said electrodes from the work blank and then to operate said hammer through a forging stroke, said last mentioned means being operable upon said hammer actuating means to maintain the work blank and the master die in engagement for a predetermined period.

11. In an apparatus for forging punches, dies and the like, chuck mechanism for holding a work blank, mounting mechanism for supporting a master die for operative forging engagement with such a work blank, means supporting said mechanism for relative approaching movement through a forging stroke, means affording a closed heating chamber about said chuck mechanism and said mounting mechanism, a carrier supporting said chuck mechanism for withdrawing movement from its operative position within said chamber to a loading position outside of said chamber, means for locking said carrier with said chuck mechanism extended into said operative position, a pair of movably mounted electrodes extended into said chamber and having active positions wherein the inner ends thereof engage a work blank held by said chuck mechanism and having inactive positions wherein said electrodes are separated from such a work blank, said electrodes having internal passages extended relatively close to the inner ends thereof, means for supplying cooling liquid to said passages, actuating means for shifting said electrodes back and forth between their active and inactive positions, a forging hammer for effecting relative approaching movement of said members through a forging stroke, means for actuating said hammer, means controlled by said locking means for disabling said hammer actuating means when said locking means is unlocked, means controlled by said locking means for feeding an oxygen free gas through said chamber when said locking means is locked, timing means, starting means operable to control said electrode actuating means and said timing means to first shift said electrodes to their active positions and then to initiate operation of said timing means, means operable by said timing means upon initiation of the operation of said timing means to energize said electrodes for a predetermined heating period and then to deenergize said electrodes, means operable by said timing means to control said electrode actuating means and said hammer actuating means after said electrodes have been deenergized to separate said electrodes from the work blank and then to operate said hammer through a forging stroke, said last mentioned means being operable upon said hammer actuating means to maintain the work blank and the master in engagement for a predetermined period.

12. In an apparatus for forging punch punches, dies or the like, means forming a heating and forging chamber, means for supporting a master die in said chamber at one side thereof and facing toward the other side of the chamber, a work-supporting chuck disposed in a working position in a normally spaced and opposed relation to the master die, means supporting said chuck for movement through an operative forging stroke toward said master die, a forging hammer for driving said chuck through such a forging stroke, means supporting said chuck for movement from said working position to a loading position wherein said chuck is exposed outside of said chamber, locking means for securing said chuck in said working position, electrodes extended into said chamber and adapted for movement between active positions wherein said electrodes are engaged with opposite sides of a work blank supported in said chamber by said chuck and inactive positions wherein said electrodes are spaced from such a blank, electrode shifting means for actuating said electrodes between their active and inactive positions, hammer actuating means for operating said forging hammer through an operative stroke to drive said chuck toward the master die and for maintaining the work blank in engagement with the master die after the forging stroke, timing means operable through a predetermined timing cycle, manually operable starting means operable to control said electrode actuating means to shift said electrodes to their active positions and then to initiate operation of said timing means through a timing cycle, means associated with and controlled by said timing means to energize said electrodes for a predetermined period to heat the work blank and then to deenergize said electrodes, means associated with and controlled by said timing means to control said electrode actuating means to shift said electrodes to said inactive positions as soon as said electrodes have been deenergized and to render said hammer actuating means operable to thereafter drive said hammer through a forging stroke and to maintain the work blank in engagement with the master die for a predetermined period.

13. In a forging apparatus for forming punches, dies and the like, a die holder for supporting a master die and a work holder having a chuck for supporting a work blank in an operative position opposed to such a die, means associated with one of said holders and forming a heating chamber enclosing the space in which a work blank is disposed when it is in said operative position, means supporting said holders for relative approaching movement through a forging stroke and including means for shifting one of said holders relative to the other of said holders in a direction laterally of the direction of said approaching movement so as to expose said chuck outside of said chamber for loading or unloading of a blank, hammer means for effecting such relative movement of said holders through a forging stroke, means extended into said chamber for heating a work blank supported in said chuck, means for actuating said hammer means, and means operable to prevent oxidation of such a work blank as it is heated in said chamber.

14. In a forging apparatus for forming punches, dies and the like, a work holder and a master die holder disposed in an opposed and spaced operative relation and supported for relative approaching movement through a forging stroke and for relative lateral displacement to expose said work holder for work-loading or unloading operations, means associated with one of said holders and adapted to cooperate with the other of said holders to afford a heating chamber about the space between said holders, means for heating a work blank supported in said chamber, and including electrodes extended into said chamber, means for shifting said electrodes into and out of contact with such a work blank, said electrodes having coolant passages therein, means for supplying coolant to said passages, means affording a sight opening for checking the flow of coolant in said passages, timing means, means controlled by said timing means for supplying a heating current to said electrodes for a predetermined heating period, means for passing illuminating gas through said chamber to protect the work blank against oxidation when the blank is heated, a gas burner supplied with fuel from said chamber and affording a visual check upon the flow of gas in said chamber, means for turning the flow of gas through said chamber on or off, means operable to ignite the gas when it is supplied to said burner from said chamber, and means controlled by said timing means and operable upon the conclusion of such a heating period to separate said electrodes from the heated work blank and thereafter to effect relative movement of said holders through a forging stroke.

15. In a forging apparatus for forming punches, dies and the like, a die holder for supporting a master die and a work holder having a chuck for supporting a work blank in an operative position opposed to such a die, means associated with one of said holders and forming a heating chamber enclosing the space in which a work blank is disposed when it is in said operative position, means supporting said holders for relative approaching movement through a forging stroke and including a carrier for shifting one of said holders in a direction laterally of the direction of said approaching movement to expose said chuck outside of said chamber for loading or unloading of a blank, hammer means for effecting such relative movement of said holders through a forging stroke, means extended into said chamber for heating a work blank supported in said chuck, means for actuating said hammer means, means for operating said heating means and said hammer means successively and in timed relation, means for passing a non-oxidizing gas through said chamber while said heating means is in operation, and means operable automatically when said work holder is exposed for loading or unloading to cut off the flow of such gas.

16. In an apparatus for forging punches, dies and the like, a body affording a heating chamber, a support for supporting a master die within said chamber, a work blank support for positioning a work blank in an operative position within said chamber in opposed relation to a master die mounted in said die support, means for heating such a work blank, means for feeding a protective gas through said chamber while such a work blank is being heated, a valve for controlling such flow of protective gas, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, locking means for securing said carrier in an operative position with said work holder disposed in its operative position in said chamber, and means controlled by said locking means to actuate said valve to cut off the flow of such gas when said locking means are unlocked and to turn on such flow of gas when said locking means are locked.

17. In a forging apparatus for forming punches, dies and the like, a die holder for supporting a master die and a work holder having a chuck for supporting a work blank in an operative position opposed to such a die, means associated with one of said holders and forming a heating chamber enclosing the space in which a work blank is disposed when it is in said operative position, means supporting said holders for relative approaching movement through a forging stroke and including means for shifting one of said holders in a direction laterally of the direction of said approaching movement to expose said chuck outside of said chamber for loading or unloading of a blank, hammer means for effecting such relative movement of said holders through a forging stroke, means extended into said chamber for heating a work blank supported in said chuck, means for actuating said hammer means, means operable to feed gas through said heating chamber to prevent oxidation of such a work blank as it is heated in said chamber, means operable automatically when said work holder is exposed for loading or unloading to cut off the flow of such gas, and indicating means whereby the operator may determine whether such gas is present in said chamber.

18. In an apparatus for forging punches, dies and the like, a body affording a heating chamber, a support for supporting a master die within said chamber, a work blank support for positioning a work blank in an operative position within said chamber in opposed relation to a master die mounted in said die support, means for heating such a work blank, means for feeding a protective gas through said chamber while such a work blank is being heated, a valve for controlling such flow of protective gas, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, locking means for securing said carrier in an operative position with said work holder disposed in its operative position in said chamber, means controlled by said locking means to actuate said valve to cut off the flow of such gas when said locking means are unlocked and to turn on such flow of gas when said locking means are locked, and means operated by said locking means for disabling said hammer actuating means when said locking means is unlocked.

19. In an apparatus for forging punches, dies and the like, a body affording a heating chamber, a support for supporting a master die within said chamber, a work blank support for positioning a work blank in an operative position within said chamber in opposed relation to a master die mounted in said die support, means for heating such a work blank, means for feeding a protective gas through said chamber while such a work blank is being heated, a valve for controlling such flow of protective gas, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, locking means for securing said carrier in an operative position with said holder disposed in its operative position in said chamber, and means controlled by said locking means to actuate said valve to cut off the flow of such gas when said locking means are unlocked and to turn on such flow of gas when said locking means are locked, actuating means for operating said hammer means, and means for controlling said hammer actuating means and including means effective when said carrier is in its operative position to enable said hammer actuating means to be operated and effective when said carrier is displaced from said operative position to disable said hammer actuating means.

20. In an apparatus for forging punches, dies and the like, a body affording a heating chamber, a support for supporting a master die within said chamber, a work blank support for positioning a work blank in an operative position within said chamber in opposed relation to a master die mounted in said die support, means mounting said supports for relative approaching movement to effect forging cooperation between a work blank and a master die, hammer means for effecting such forging cooperation, a carrier upon which said work blank support is mounted for movement out of said heating chamber and to a predetermined loading position outside of said chamber, work clamping means forming part of said work support and mounted on said carrier, operating means on said carrier for operating said work clamping means, actuating means for operating said hammer means, locking means for securing said carrier in an operative position with said work holder disposed in its position in said chamber, a pair of electrodes extending into said chamber for heating cooperation with a work blank in said chamber, shifting means for separating said electrodes and maintaining the same separated during work loading and unloading operations, means for preventing oxidation of such a work blank while it is being heated and including a main gas supply for passing illuminating gas through said chamber, means affording a constantly burning pilot burner, means for turning off said main gas supply means when a work blank is being loaded and for turning on such gas supply when such a blank has been moved into said chamber, means for engaging said electrodes with a work blank after the blank has been moved into position in said chamber, means operable to energize said electrodes for a predetermined heating period after the electrodes have been thus engaged with the work blank to heat the work blank to a forging temperature and then to deenergize said electrodes, means operable automatically upon deenergization of said electrode to operate said shifting means to separate said electrodes and to initiate operation of said hammer actuating means to operate said hammer means through a forging stroke.

21. In a forging apparatus for forming punches, dies and the like, a pair of spaced upstanding frame members, a body supported on said frame members so as to span the space therebetween and affording a heating chamber, a die holder mounted on an upper portion of said body and adapted to rigidly support a master die in a position wherein such a master die faces downwardly into said heating chamber, a carrier including an elongated cylinder and pivoted on and between said frame members on a horizontal axis beneath said chamber for movement from an operative position wherein said cylinder is aligned with said die holder to an inoperative loading position wherein the upper end of said carrier is exposed in an upwardly and forwardly facing relation forwardly of said chamber, a work holder mounted in an exposed relation at the upper end of said carrier coaxially of and for limited longitudinal movement with respect to the cylinder and having an inner end facing downwardly within the cylinder, means urging said work holder downwardly of said cylinder, a piston within said cylinder constituting a hammer adapted in its upward stroke to engage said inner end of said work holder to drive the same through a forging stroke toward said die holder, heating means for heating a work blank supported in said chamber by said work holder and including a pair of shiftable electrodes extended into said chamber, cam means for shifting said electrodes into and out of contact with such a work blank, pressure fluid operated means for actuating said cam means, timing means for causing operation of said heating means through a predetermined heating period, and control means governed by said timing means for supplying pressure fluid to said cylinder to actuate said piston through an upward stroke and to said pressure fluid operated means to separate said electrodes prior to the time when said piston strikes said work holder, said control means being operable to maintain said piston in its upper position for a predetermined period.

22. In a forging apparatus for forming punches, dies and the like, a work holder and a master die holder disposed in an opposed and spaced operative relation, means associated with one of said holders and adapted to cooperate with the other of said holders to afford a heating chamber about the space between said holders, means supporting said holders for relative approaching movement through a forging stroke and for relative lateral displacement to expose said work holder outside of said chamber for work-loading or unloading operations, electrodes extended into said chamber for heating a work blank supported in said chamber, means for shifting said electrodes into and out of contact with such a work blank, means affording a liquid cooling circuit through each of said electrodes, means for supplying a heating current to said electrodes for a predetermined heating period, means for passing a non-oxidizing protective gas through said chamber while a blank is being thus heated, and means operable upon the conclusion of such a heating period to separate said electrodes and thereafter to effect relative movement of said holders through a forging stroke.

GASPAR P. BENES.